US009086708B2

(12) United States Patent
Tournatory et al.

(10) Patent No.: US 9,086,708 B2
(45) Date of Patent: Jul. 21, 2015

(54) HIGH SLEW RATE SWITCHING REGULATOR CIRCUITS AND METHODS

(71) Applicant: Gazelle Semiconductor, Inc., San Carlos, CA (US)

(72) Inventors: David Christian Gerard Tournatory, San Carlos, CA (US); Kevin Kennedy Johnstone, Mountain View, CA (US)

(73) Assignee: Gazelle Semiconductor Inc., Redwood City, CA (US)

( * ) Notice: Subject to any disclaimer, the term of this patent is extended or adjusted under 35 U.S.C. 154(b) by 212 days.

(21) Appl. No.: 13/794,231

(22) Filed: Mar. 11, 2013

(65) Prior Publication Data

US 2014/0184177 A1 Jul. 3, 2014

Related U.S. Application Data

(60) Provisional application No. 61/747,988, filed on Dec. 31, 2012.

(51) Int. Cl.
G05F 1/10 (2006.01)
G05F 1/12 (2006.01)
H02M 3/00 (2006.01)
H02J 3/12 (2006.01)
H02J 3/00 (2006.01)
H02M 3/158 (2006.01)
H02M 3/156 (2006.01)

(52) U.S. Cl.
CPC ... *G05F 1/12* (2013.01); *H02J 3/00* (2013.01); *H02J 3/12* (2013.01); *H02M 3/00* (2013.01); *H02M 3/158* (2013.01); *H02M 2003/1566* (2013.01)

(58) Field of Classification Search
USPC .............. 323/222, 225, 272, 282, 285; 363/65
See application file for complete search history.

(56) References Cited

U.S. PATENT DOCUMENTS

| 4,673,889 A | 6/1987 | Cini et al. |
| 5,418,707 A | 5/1995 | Shimer et al. |
| 5,570,276 A | 10/1996 | Cuk et al. |
| 5,581,451 A | 12/1996 | Ochiai |

(Continued)

FOREIGN PATENT DOCUMENTS

| EP | 1172924 A3 | 2/2002 |
| EP | 2002558 B1 | 9/2011 |

(Continued)

OTHER PUBLICATIONS

International Search Report (from a corresponding foreign application), PCT/US2013/078355, mailed Apr. 8, 2014.

(Continued)

*Primary Examiner* — Matthew Nguyen
*Assistant Examiner* — Trinh Dang

(57) ABSTRACT

Embodiments of the disclosure include high slew rate switching regulator circuits and methods. In one embodiment, switching regulators are coupled to an output node. A first switching regulator may drive the output node. A second switching regulator may drive the output node through a capacitor. Control circuitry may include feedback inputs to maintain a first voltage on the output of the first switching regulator on one terminal of the capacitor and further to maintain a second voltage on the output of the second switching regulator on the other terminal of the capacitor.

20 Claims, 26 Drawing Sheets

(56) References Cited

U.S. PATENT DOCUMENTS

| | | |
|---|---|---|
| 5,592,071 A | 1/1997 | Brown |
| 5,615,093 A | 3/1997 | Nalbant |
| 5,770,940 A | 6/1998 | Goder |
| 5,929,692 A | 7/1999 | Carsten |
| 6,396,137 B1 | 5/2002 | Klughart |
| 6,894,464 B2 | 5/2005 | Zhang |
| 6,987,380 B1 | 1/2006 | Lee |
| 7,250,746 B2 | 7/2007 | Oswald et al. |
| 7,432,614 B2 | 10/2008 | Ma et al. |
| 7,486,060 B1 | 2/2009 | Bennett |
| 7,499,682 B2 | 3/2009 | Rozenblit et al. |
| 7,538,535 B2 | 5/2009 | McDonald et al. |
| 7,730,340 B2 | 6/2010 | Hu et al. |
| 8,085,020 B1 | 12/2011 | Bennett |
| 8,248,152 B2 | 8/2012 | Dennard et al. |
| 2005/0007086 A1 | 1/2005 | Morimoto |
| 2005/0200404 A1* | 9/2005 | Bernardon .................. 330/10 |
| 2007/0195876 A1 | 8/2007 | Prodic |
| 2008/0197827 A1 | 8/2008 | Wrathall |
| 2011/0204862 A1 | 8/2011 | Prodic et al. |
| 2013/0200849 A1 | 8/2013 | Crebier et al. |
| 2013/0214752 A1 | 8/2013 | Tournatory |
| 2013/0214858 A1 | 8/2013 | Tournatory et al. |
| 2014/0049235 A1 | 2/2014 | Li et al. |

FOREIGN PATENT DOCUMENTS

| | | |
|---|---|---|
| EP | 2493060 A1 | 8/2012 |
| WO | 2009067591 A2 | 5/2009 |
| WO | 2011-128849 A2 | 10/2011 |
| WO | 2013122782 A1 | 8/2013 |

OTHER PUBLICATIONS

International Search Report and Written Opinion—PCT/US2014/65917—ISA/US—Feb. 11, 2015.

Josh Wibben et al, "A High-Efficiency DC-DC Converter Using 2 nH Integrated Inductors", IEEE Journal of Solid-State Circuits, Jul. 7, 2007, pp. 844-854, vol. 43, No. 4.

International Search Report (from a corresponding foreign application), PCT/US2014/45812, mailed Dec. 5, 2014.

\* cited by examiner

HIGH SLEW RATE SWITCHING REGULATOR CIRCUITS AND METHODS

CROSS-REFERENCE TO RELATED APPLICATIONS

This application claims benefit of U.S. Provisional Patent Application Ser. No. 61/747,988 entitled "Switching Regulator Circuits and Methods," filed Dec. 31, 2012, the disclosure thereof incorporated by reference herein in its entirety.

FIELD

The present disclosure relates to switching regulator circuits and methods.

BACKGROUND

The development of microprocessors, following Moore's Law, has resulted in increasing on-chip power density, leading to thermal management challenges. CMOS processes have at least two components of power dissipation: 1) switching power, which is proportional to the square of the supply voltage and to clock frequency; and 2) device leakage power, which is a function of supply voltage.

Increasingly, micro-management of microprocessor supply voltage and clock frequency vis-à-vis its workload profile is used to gain significant power savings. Given that the main power dissipation mechanisms are strong functions of the supply voltage, significant power consumption reduction can be achieved with moderate reduction in the average supply voltage over time and usually with modest or no reduction in circuit performance.

Dynamic Voltage and Frequency Scaling (DVFS) techniques are used today at relatively low rates compared to the microprocessor rate of activity. The DVFS rate is currently limited by the voltage slew rate of available voltage regulators. The more closely the voltage regulator can track the microprocessor workload in real time, the more the time averaged supply voltage can be reduced, potentially resulting in significant power savings. Therefore, the full potential of existing DVFS techniques has been limited by voltage regulator technology.

For instance, some systems adjust the supply voltage and clock frequency at the Unix Kernel level with frequency being adjusted about every 10 us. Supply voltage is adjusted less frequently, due to the limitations of conventional regulators. This means that supply voltage is held unnecessarily at its peak while clock frequency is reduced. Therefore, the resulting average supply voltage, and associated average power dissipation, is higher than the theoretical average required by the workload.

FIG. 1 illustrates a conventional multi-phase step-down switching regulator. One significant problem associated with using conventional single- and multi-phase regulators to achieve high slew rates is that such regulators exhibit asymmetric slew rates that can adversely impact system performance. Furthermore, at high switching frequencies, such circuits may require impractically small inductor values or an impractically high number of phases.

FIG. 2 illustrates the configuration of a multi-phase step-down switching regulator during positive slew. For input voltage VIN and output voltage VOUT, a conventional n-phase step-down switching regulator will command a maximum positive output current slew-rate by activating switches to short the switch node(s) SW1 and SW2 through SWN to VIN. This results in the sum of the inductor(s) current(s) to slew at the rate:

$$(VIN-VREF)/L/n$$

FIG. 3 illustrates the configuration of a conventional multi-phase step-down switching regulator during negative slew. To command a maximum negative current slew rate, the controller 302 activates the switches to short the switch node(s) SW1 and SW2 through SWN to ground. This results in the sum of the inductor(s) current(s) to slew at the rate:

$$(-VREF)/L/n$$

The positive output current slew rate is therefore a factor of (VIN−VREF)/(VREF) higher than the negative output current slew rate. For example, if VIN is at 12V and VOUT at 1V (low duty cycle case) regardless of the number of phases used, a traditional step-down switching converter features a maximum positive output current slew rate (SRP) that is 11 times faster than its maximum negative output current slew-rate (SRN).

$$(SRP)/(SRN)=((VIN-VREF)/L/n)/((-VREF)/L/n)=(12-1)/1=11$$

In some applications, the positive voltage overshoot due to an off-loading event, where load current decreases, should be equal to the negative undershoot due to an equivalent loading event, where load current increases, in order for the output voltage not to drift away when the load current is stepping back and forth. As the result, a system may be limited by the off-loading output voltage overshoot due to the slow negative current slew rate of the inductor(s) and never takes advantage of the fast positive current slew-rate of the inductor(s). FIG. 4 illustrates this for a single-phase traditional buck converter going through a loading and off-loading event.

FIG. 5 shows an example of a single-phase regulator responding to a negative and then positive VREF voltage step. Due to the slow negative slew-rate, the output voltage takes a long time to slew down. Thus, the slow negative slew rate of the inductor current is again limiting how fast the output voltage can slew. As mentioned above, FIG. 5 illustrates an asymmetry that may be undesirable in some applications.

SUMMARY

In general, in one aspect, an embodiment features an apparatus comprising: a first switching regulator coupled to an output node; a second switching regulator coupled to the output node through a capacitor, wherein the capacitor comprises a first terminal coupled to the output node, and a second terminal coupled to the second switching regulator; and a master controller configured to control a voltage on the output node, wherein the master controller comprises a first feedback input coupled to the first terminal of the capacitor, and a second feedback input coupled to the second terminal of the capacitor; wherein the master controller is further configured to control a voltage on the second terminal of the capacitor.

In general, in one aspect, an embodiment features a method comprising: receiving a first signal from a processor, the first signal corresponding to a desired voltage output of a switching power supply providing a power supply voltage to the processor; changing a reference voltage for the switching power supply; providing, in response to said changing the reference voltage, a first current from one of two switching regulators in the switching power supply to an output node; providing, in response to said changing the reference voltage, a second current from the other of the two switching regulators switching regulator in the switching power to the output node; wherein the second current is opposite in polarity to the first current; wherein said providing the second current is delayed by a set amount of time from said providing the first current; and wherein either the first current or the second current flows to the output node through a capacitor.

In general, in one aspect, an embodiment features a method comprising: receiving an input voltage in a first switching regulator; receiving the input voltage in a second switching regulator; and controlling the first switching regulator to produce a first current through a first inductor and controlling the second switching regulator to produce a second current through a second inductor and a capacitor to maintain a first voltage on an output node and a second voltage between the second inductor and the capacitor.

Embodiments of the methods can include one or more of the following features. In some embodiments, the second voltage is a function of at least one of: the input voltage; and the first voltage. In some embodiments, the second voltage is equal to a difference between the input voltage and the first voltage. In some embodiments, the first switching regulator produces the first current in response to a change in a reference signal; and the second switching regulator produces the second current in response to the change in the reference signal. In some embodiments, the first switching regulator produces the first current in response to a change in a load current; an the second switching regulator produces the second current in response to the change in the load current. Some embodiments comprise controlling the first switching regulator to generate a first capacitor recharge current; and controlling the second switching regulator to generate a second capacitor recharge current; wherein the sum of the first capacitor recharge current and the second capacitor recharge current is approximately zero.

The details of one or more implementations are set forth in the accompanying drawings and the description below. Other features will be apparent from the description and drawings, and from the claims.

Figure 1:
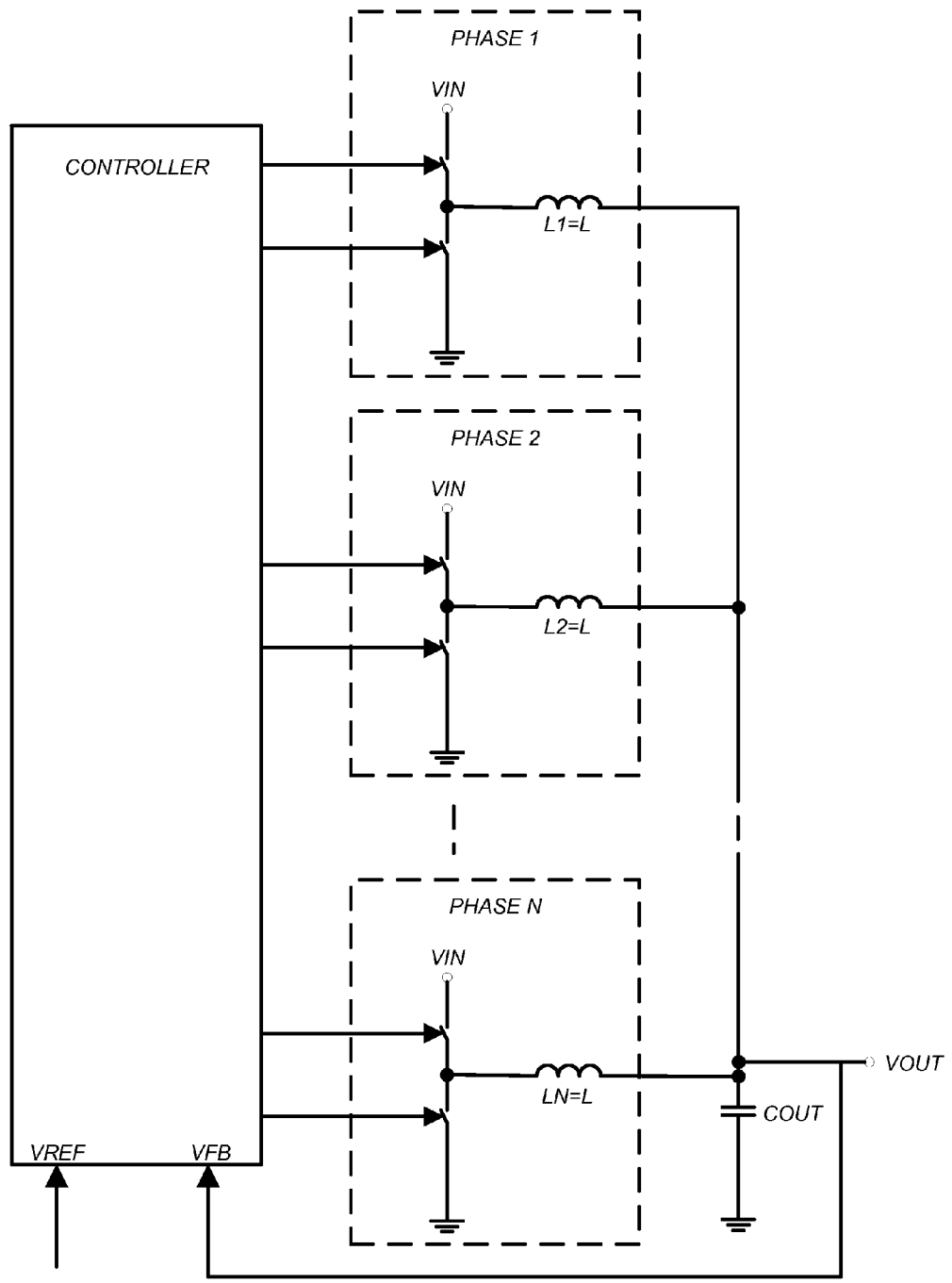
FIG. 1 illustrates a conventional multi-phase step-down switching regulator.
Figure 2:
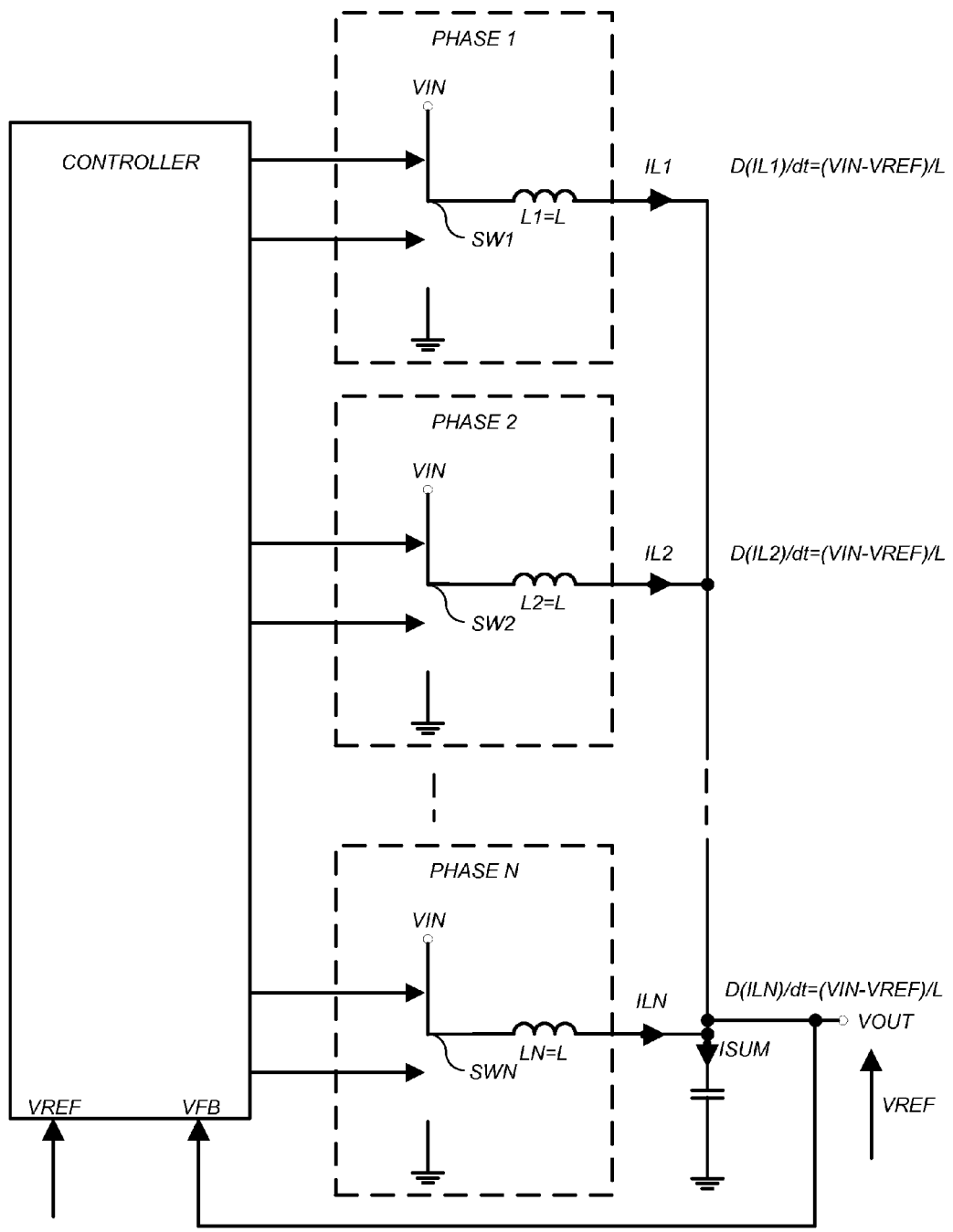
FIG. 2 illustrates the configuration of a multi-phase step-down switching regulator during positive slew.
Figure 3:
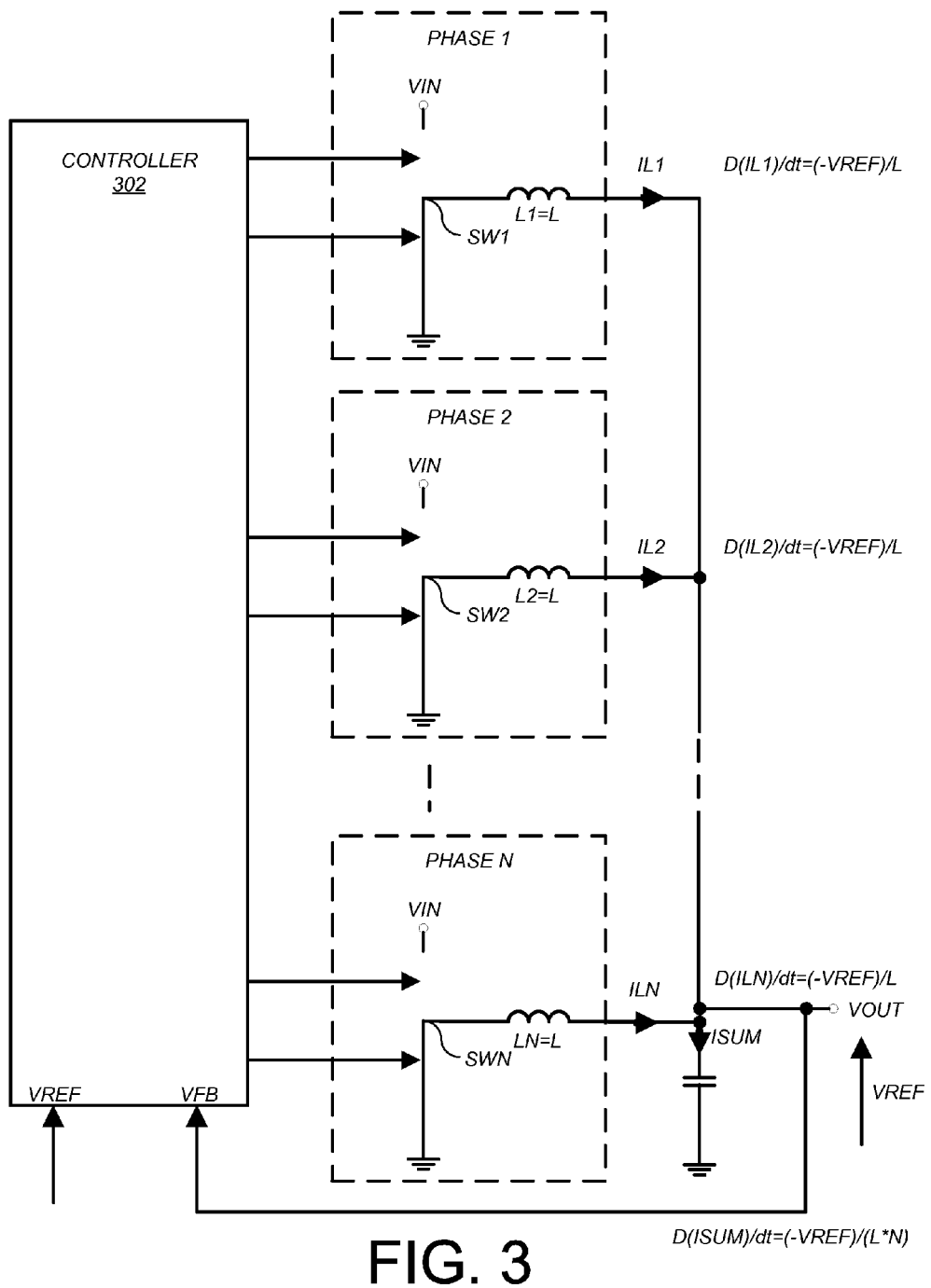
FIG. 3 illustrates the configuration of a conventional multi-phase step-down switching regulator during negative slew.
Figure 4:
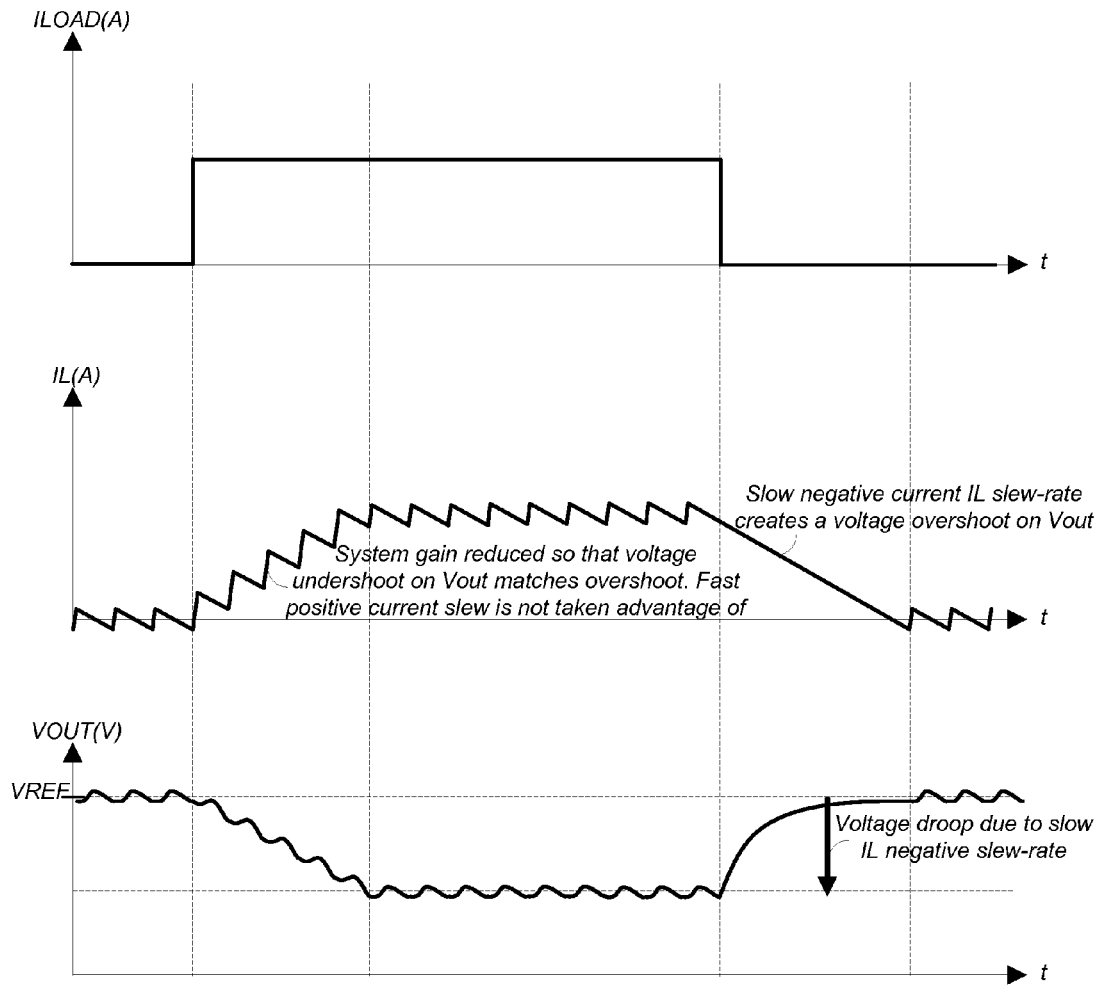
FIG. 4 illustrates a single-phase traditional buck converter going through a loading and off-loading event.
Figure 5:
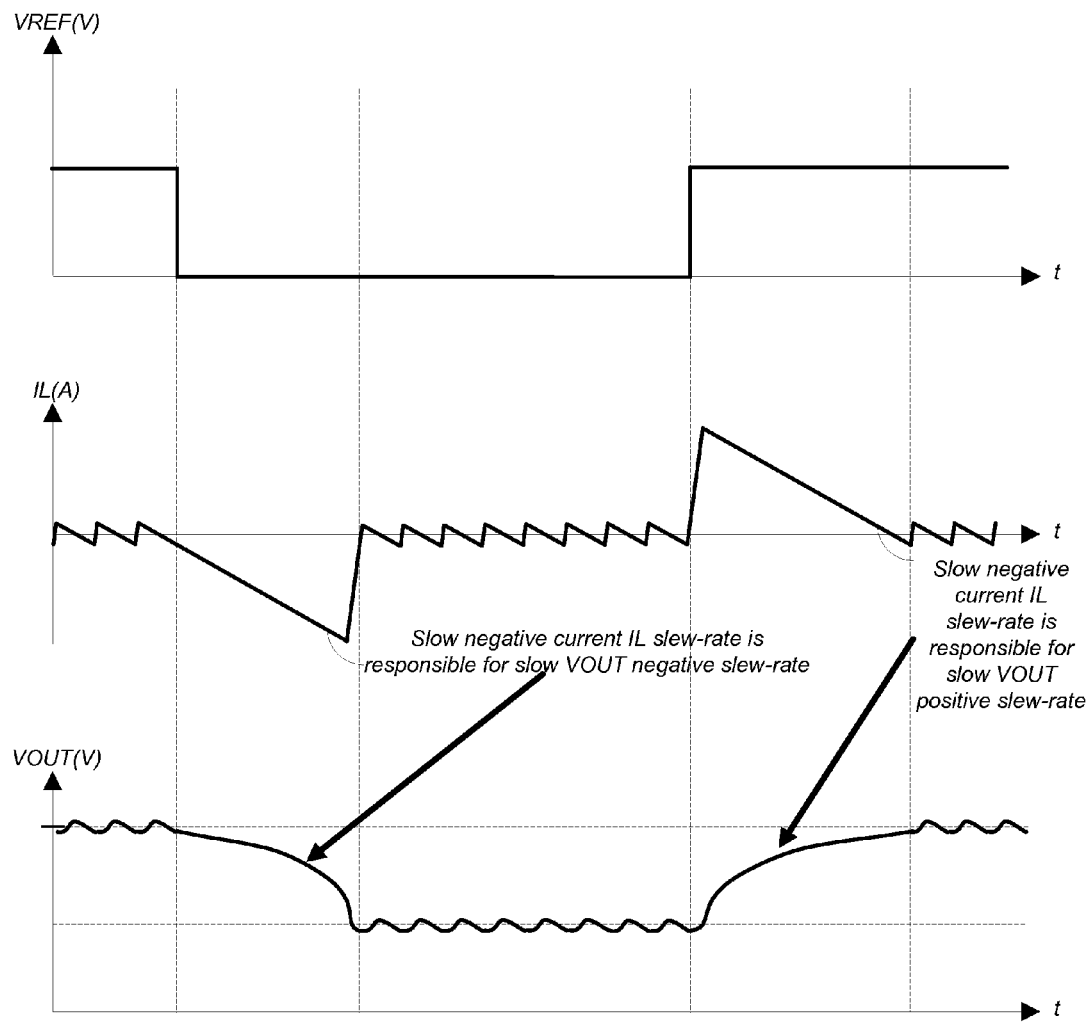
FIG. 5 shows an example of a single-phase regulator responding to a negative and then positive VREF voltage step.

The leading digit(s) of each reference numeral used in this specification indicates the number of the drawing in which the reference numeral first appears.

DETAILED DESCRIPTION

Described herein are techniques for switching regulators. In the following description, for purposes of explanation, numerous examples and specific details are set forth in order to provide a thorough understanding of the present disclosure. It will be evident, however, to one skilled in the art that various embodiments as defined by the claims may include some or all of the features in these examples alone or in combination with other features described below, and may further include modifications and equivalents of the features and concepts described herein.

Embodiments of the present disclosure include switching regulator circuits and methods. A first switching regulator may drive an output node and a second switching regulator may drive the same output node through a capacitor. In one embodiment, dual loop push-pull control of AC-coupled switching regulators is disclosed with symmetrical high current slewing at high static efficiency. Example embodiments may be used to change the power supply voltage of processors at very high slew rates without degrading static efficiency. Accordingly, power supply voltage may be modified to track the workload profile.

Figure 6:
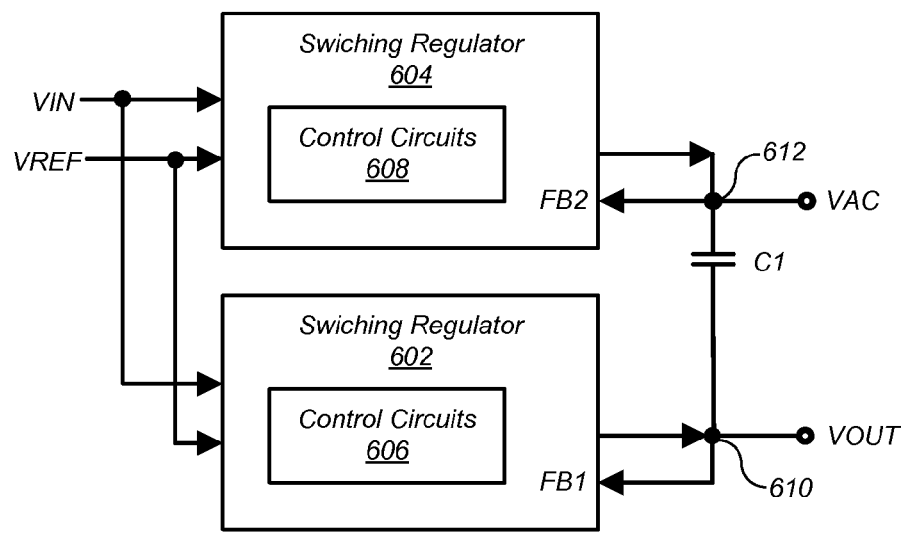
FIG. 6 illustrates a particular embodiment including AC coupled switching regulators.

FIG. 6 illustrates a particular embodiment including AC coupled switching regulators. A first switching regulator 602 is coupled to an output node 610 having a voltage Vout. The first switching regulator 602 may be coupled to the output node 610 through a first inductor (not shown), for example. A second switching regulator 604 is coupled to the output node 610 through a second inductor (not shown) and a capacitor, C1. Capacitor, C1, has a first terminal coupled to the output node having a voltage Vout. A second terminal of capacitor, C1, is coupled to the inductor (not shown) of the second switching regulator 604 and has a voltage VAC. Accordingly, the output of the second switching regulator is AC coupled to the output node 610 having a voltage Vout.

Both switching regulators 602, 604 receive an input voltage, Vin, and a reference voltage, Vref. The first switching regulator 602 has a feedback input, FB1, coupled to a first terminal of the capacitor to control a voltage on the output node 610, Vout. The second switching regulator 604 has a second feedback input, FB2, coupled to the second terminal of the capacitor to control a voltage on the second terminal of the capacitor.

The first switching regulator 602 may include control circuits 606 to produce a first current through a first inductor to maintain Vout at a particular voltage. The particular voltage may be set by Vref, for example, and a first control loop. The second switching regulator 604 may include control circuits 608 to produce a second current through the second inductor to maintain a voltage VAC at a particular voltage. VAC may be set by Vref and a second control loop. Because the second switching regulator is AC coupled to the output node 610, the second switching regulator may push and pull current to and from the output node 610, respectively, to improve the slew rate capability at the output node 610. Thus, both regulators 602, 604 may push and pull current to and from the output node 610. In one embodiment, the first control loop maintains the voltage on the output node 610 at a first voltage, Vout, and the second control loop maintains the voltage on node 612 between an inductor and capacitor, C1, at a second voltage, VAC, which is a function of the input voltage and the first voltage. In one example implementation described in more detail below, VAC is as follows:

$$VAC=Vin-Vref, \text{ where } Vref=Vout.$$

Under these conditions, the positive and negative current and voltage slew rates may be equal as described below.

Figure 7:
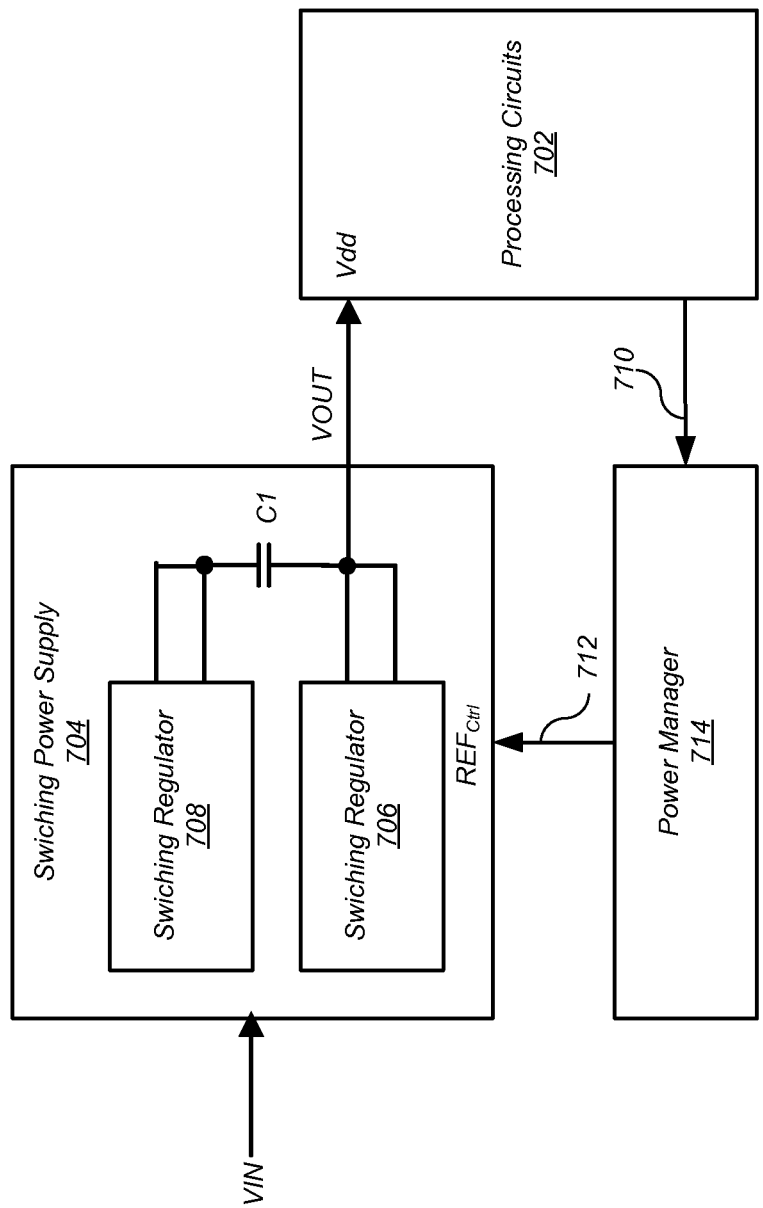
FIG. 7 illustrates an example application according to one particular embodiment.

FIG. 7 illustrates an example application according to one particular embodiment. In this example, processing circuits 702 receive a power supply voltage Vout on a Vdd terminal. The power supply voltage Vout is generated by a switching power supply 704 comprising a first switching regulator 706 and a second switching regulator 708. To reduce power consumption, it may be desirable to change the power supply voltage Vout used by the processing circuits 702. Accordingly, when conditions for changing the power supply voltage Vout occur, processing circuits 702 may send control signals 710 to the power manager 714 to change the reference 712, for example, and in turn, change the voltage at Vout. The switching power supply 704 may receive a control signal 712 corresponding to a desired voltage output Vout from a power management system 714, for example, which may monitor the state of the processing circuits 702 and determine when the power supply voltage Vout may be changed to reduce power consumption. Example processing circuits 702 may include one or more microprocessors, for example. In some embodiments, a single processor may receive multiple different power supply voltages from multiple switching power supplies 704 to provide power to different power domains, and in each power domain the power supply voltage may be changed over time to reduce power consumption.

When the switching power supply 704 receives a signal 712 indicating a change in the output voltage Vout is required (e.g., on the REF$_{ctrl}$ input), an internal reference voltage for the switching power supply 704 may change to a new voltage. The switching power supply 704 may generate a first current from the first switching regulator 706 through a first inductor to the output, and may further generate a second current from the second switching regulator 708 through a second inductor and the capacitor, C1, to the output node. Based on the polarity of the currents, the voltage Vout at the output of the switching power supply 704 (e.g., the voltage on the power supply terminal Vdd of the processing circuits) may be changed.

Figure 8:
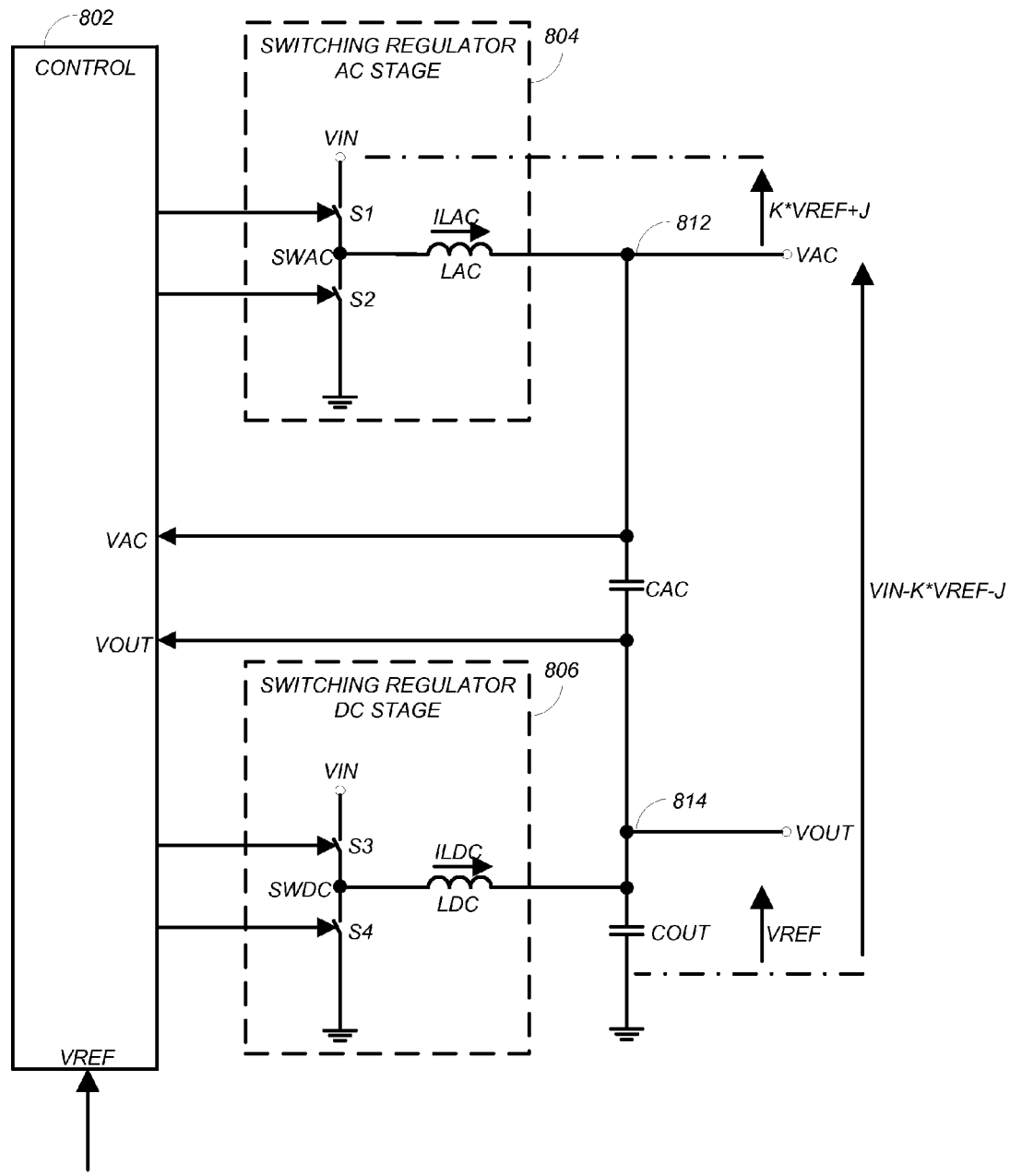
FIG. 8 illustrates another example implementation according to a particular embodiment.

FIG. 8 illustrates another example implementation according to a particular embodiment. This example includes a control circuit 802 and a network of inductors and capacitors arranged according to the topology shown. As will be explained in detail, features and advantages of some embodiments of the present disclosure include a positive output current slew-rate equal to the negative output current slew-rate. In addition to this symmetrical slew-rate property, some embodiments feature a push-pull and/or a pull-push current action able to greatly increase the voltage slew rate of the output node 814. From FIG. 8 it can be seen that a first switching regulator 806 receives an input voltage, VIN, and a reference voltage, VREF. In this example, VOUT is equal to VREF, but in other embodiments VOUT may be related to VREF. The first switching regulator 806, occasionally referred to herein as the "DC Stage", includes switches S3 and S4, an inductor LDC, and a feedback input VOUT. Circuits in the controller 802 for receiving VREF and the feedback signal at VOUT and producing driver signals to turn the switches S3 and S4 on and off may be considered part of the first switching regulator 806.

A second switching regulator 804 receives the input voltage, VOUT, and the reference voltage, VREF. The second switching regulator 804, occasionally referred to herein as the "AC Stage", includes switches S1 and S2, an inductor LAC, and a feedback input VAC. A capacitor CAC is coupled between an output of the first switching regulator 806, VOUT node 814, and an output of the second switching regulator 804, VAC node 812. The second inductor LAC has a control loop from VAC, between inductor LAC and capacitor CAC, to control the voltage on VAC. Circuits in the controller 802 for receiving VREF and the feedback signal at VAC and producing driver signals to turn the switches S1 and S2 on and off may be considered part of the second switching regulator 804.

Embodiments of the present disclosure include a switching converter able to take advantage of high step-down ratios. Particular embodiments may combine, under control of two closed loops, high positive inductor current slew rate in a DC phase (LDC) and high negative inductor current slew rate in an AC phase (LAC) to provide fast voltage regulation in response either to a reference voltage step or load step. The DC phase features a high positive current slew-rate and a low negative current slew rate. The AC phase features the opposite (low positive current slew-rate and high negative current slew rate).

For a DVFS application, it may be desirable to transition voltages as quickly as possible so that the actual workload profile can be followed as closely as possible for maximum power savings. In some applications, it may be desirable that slewing be symmetrical, or at least that the positive and negative edges have similar speeds. Some example embodiments may combine DC and AC-phase current to support a symmetrical current slew rate of ±(Vin/L), for example.

In one embodiment, symmetric current slew rate may be achieved through closed loop regulation of the VAC node 812 to a voltage equal to $$VAC=A \times VIN+B \times VREF+C,$$

where A, B and C are system coefficients. These may be set at A=1, B=−1 and C=0 for symmetrical response and optimum performance. For the examples that follow, it will be assumed that A=1, B=−1 and C=0, but different values can also be used.

Figure 9:
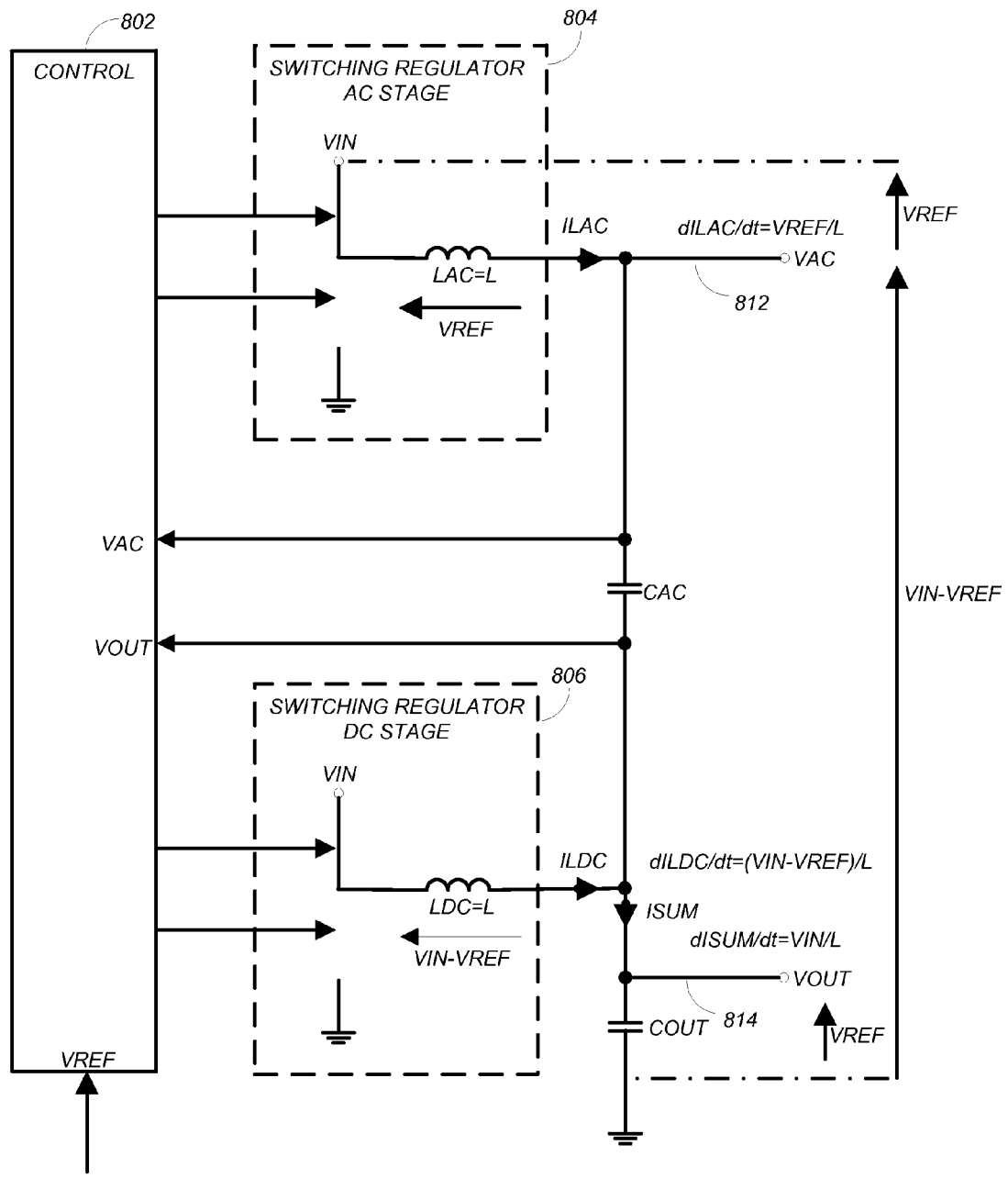
FIG. 9 illustrates the configuration of the circuit in FIG. 8 for positive current slewing.
Figure 10:
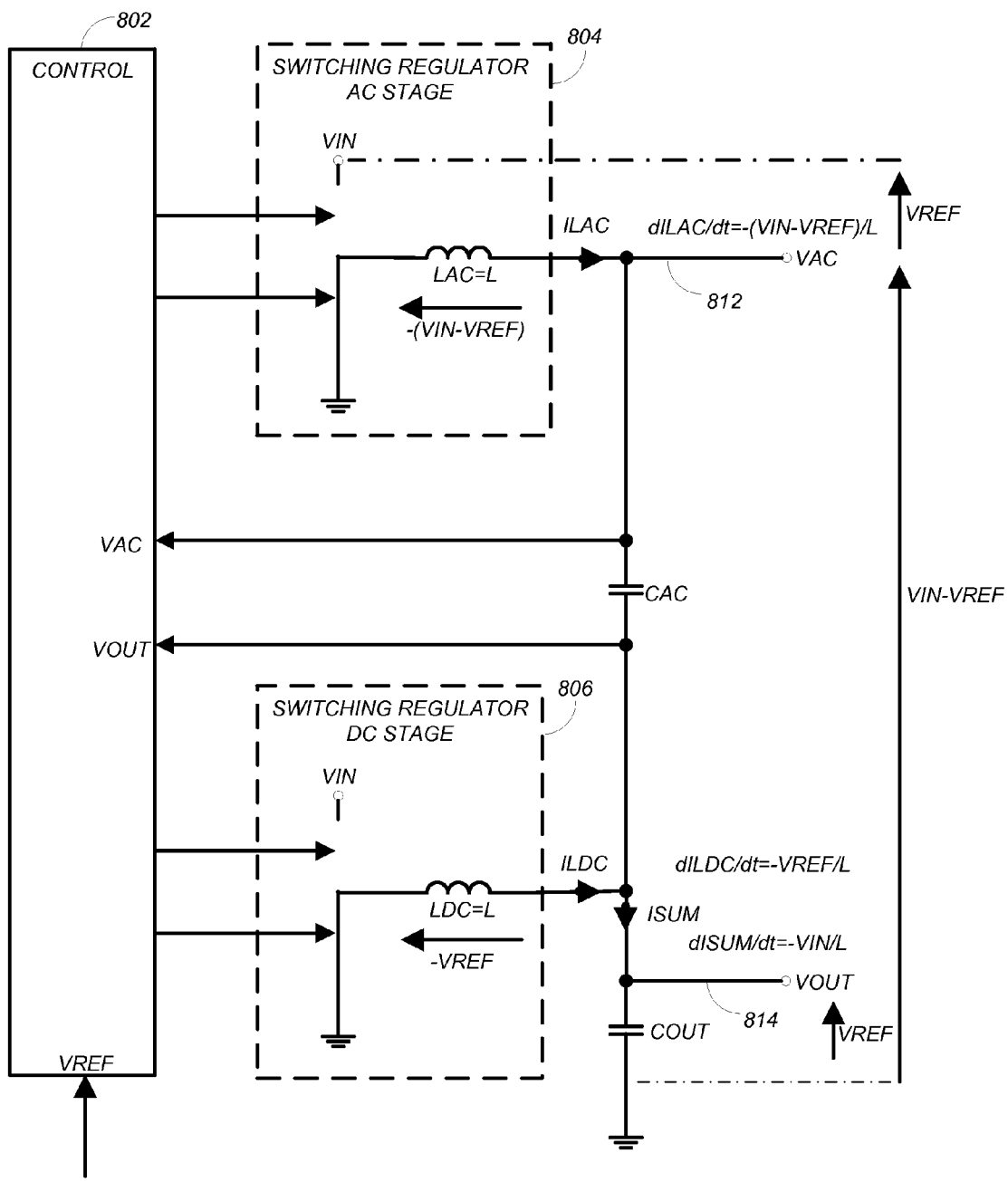
FIG. 10 illustrates the configuration of the circuit in FIG. 8 for negative current slewing.

FIG. 9 illustrates the configuration of the circuit in FIG. 8 for positive current slewing. FIG. 10 illustrates the operation of the circuit in FIG. 8 for negative current slewing. In this example, the system takes advantage of the CAC cap to force a voltage on the VAC node 812 equal to VIN-VREF.

As illustrated in FIG. 9, the voltage across inductor LDC is a large positive voltage (VIN−VREF). Thus, the inductor current positive slew rate from LDC is:

(VIN−VREF)/L.

Similarly, the voltage across inductor LAC is VIN−(VIN−VREF). Thus, the inductor current positive slew rate from LAC is:

VREF/L.

Thus, for positive slewing, the LDC inductor has a much larger voltage and corresponding current slew rate than the LAC inductor. However, the sum of the two inductor currents slews up at:

VREF/L+(VIN−VREF)/L=VIN/L.

FIG. 10 shows the circuit configuration for negative current slewing. As illustrated in FIG. 10, the voltage across inductor LAC is a large negative voltage (−(VIN−VREF)). Thus, the inductor negative current slew rate from LAC is:

−(VIN−VREF)/L.

Similarly, the voltage across inductor LDC is (−VREF). Thus, the inductor current negative slew rate from LAC is:

−(VREF/L).

Thus, for negative slewing, the LAC inductor has a much larger voltage and corresponding current slew rate than the LDC inductor. However, the sum of the two inductors currents slews down at:

(−VREF/L)+(−(VIN−VREF)/L)=−VIN/L.

Accordingly, under these conditions, the sum of the inductor current slew rates for a positive slew is equal in magnitude to the sum of the inductor current slew rates for a negative slew.

As shown in FIG. 9, regulation of the VAC node 812 voltage at (VIN−VREF) allows cancellation of the VREF term at the output, and the resulting combined current slew rate is based on VIN. Similarly, as shown in FIG. 10, the large negative voltage −(VIN−VREF) applied across the LAC terminal is generated by grounding one of the terminals of LAC and connecting the other to the VAC node 812. Regulation of the VAC node 812 voltage at (VIN−VREF) in closed loop again results in cancellation of the VREF term resulting in a combined slew rate based on VIN. For this example implementation, if VAC is not regulated, random deviations of VAC from (VIN−VREF) may degrade VOUT regulation and impact performance.

Figure 11:
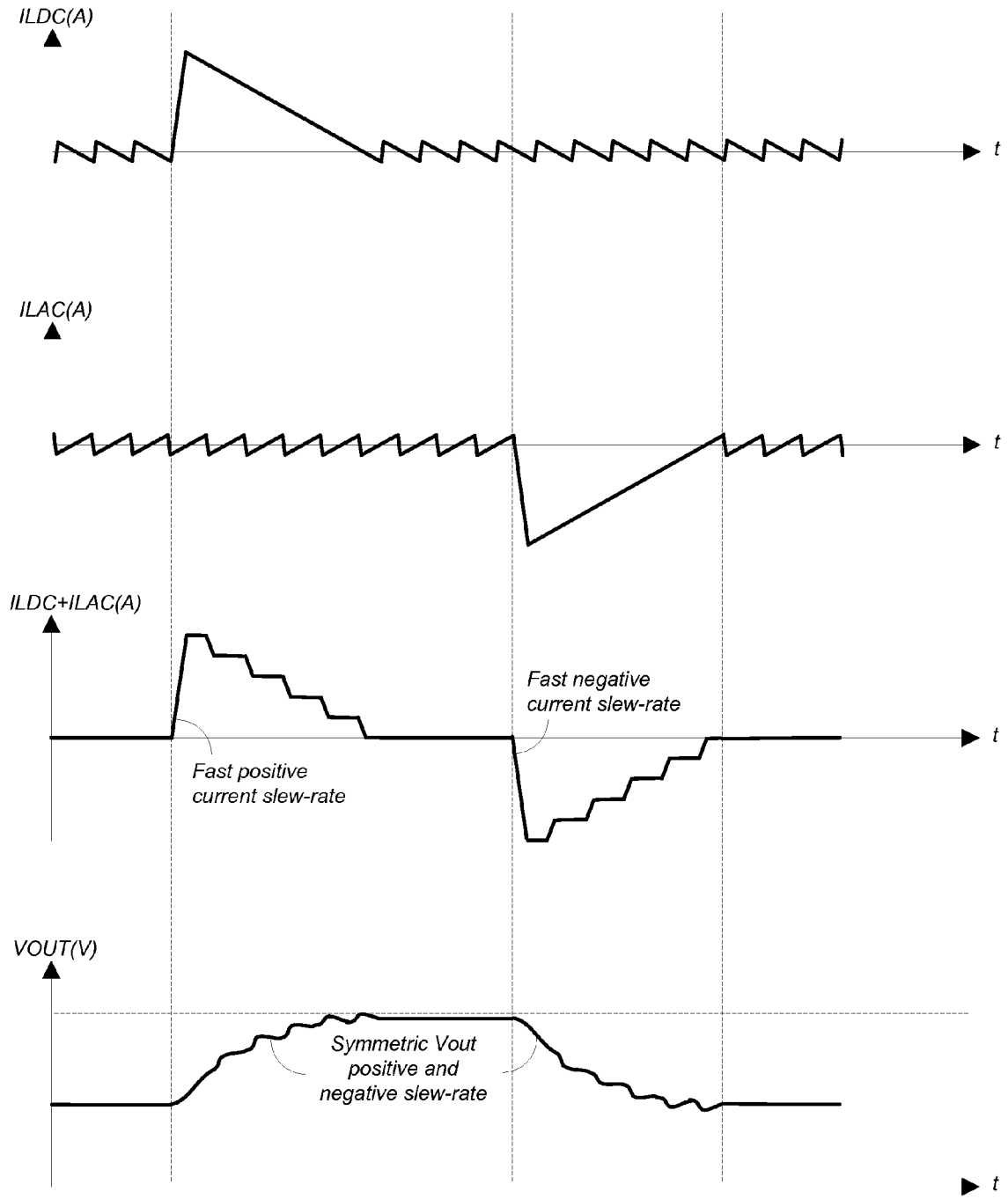
FIG. 11 shows current and voltage waveforms for the circuit in FIGS. 8-10 according to one example operation.

FIG. 11 shows current and voltage waveforms for the circuit in FIGS. 8-10 according to one example operation. The waveforms show how the system may respond to a voltage reference (VREF) step up followed by step down. Note that the step down response features an initial negative slew rate faster than a conventional buck step-down switching regulator (the current is ramping down faster) and the overall response is symmetric.

In this example, in steady state, the loop independently controls the instantaneous duty cycle of each of the LDC and LAC inductors. Having independent control of the LDC and LAC inductor duty-cycles in steady state may ensure active regulation of the VAC node 812 voltage at a desired voltage level (e.g., VIN−VREF), in anticipation of the next load step.

Figure 12:
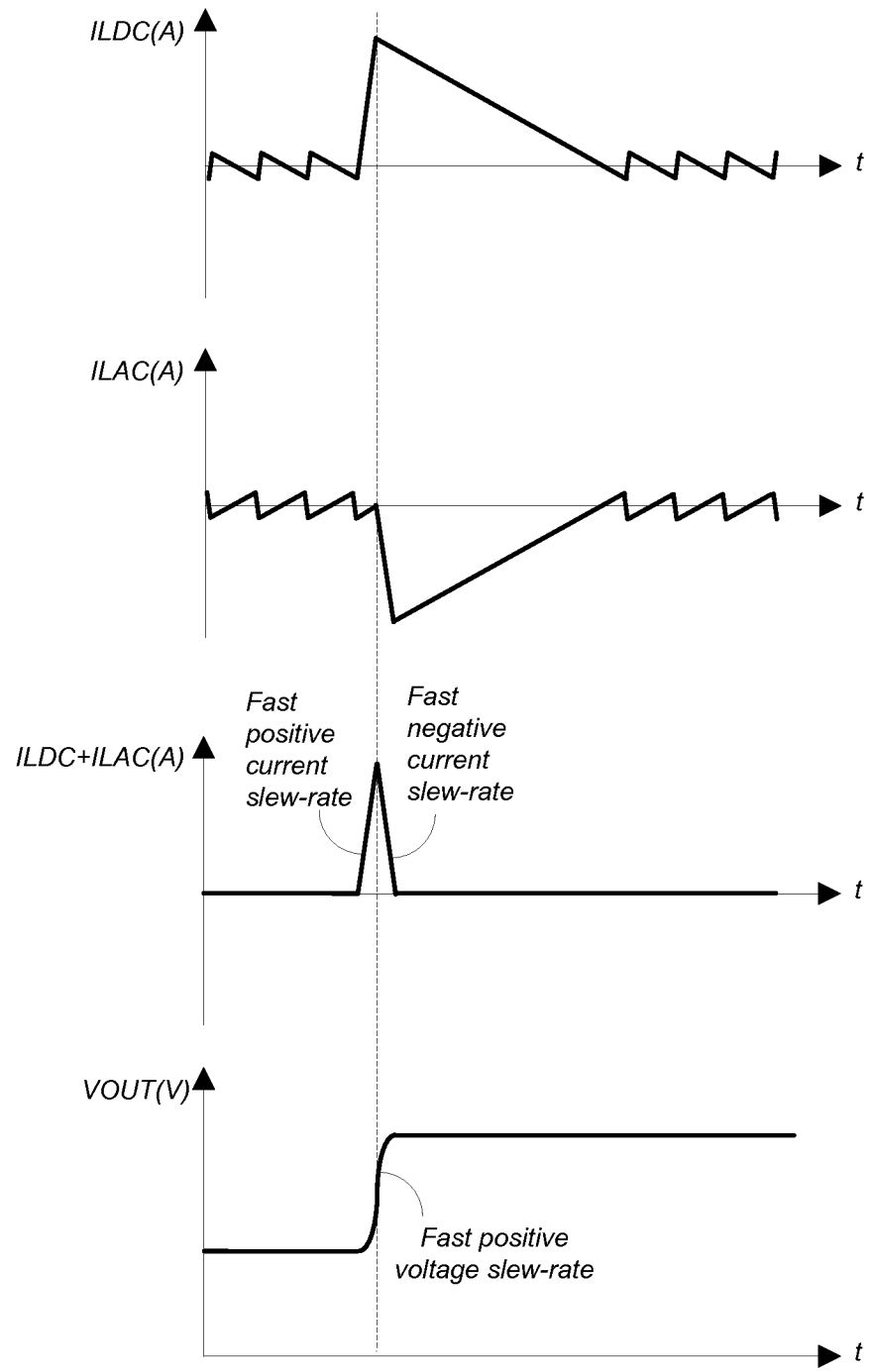
FIG. 12 illustrates push-pull operation of the circuit of FIGS. 8-10.

In one example embodiment, the circuit of FIGS. 8-10 may be operated to perform push-pull and/or pull-push actions to improve system response. From FIG. 11 it can be seen that the LDC inductor current ILDC ramps up quickly, but ramps down slowly. Conversely, the LAC inductor current ILAC ramps down quickly, but ramps up slowly. Combining a quick ramp up of the LDC inductor current ILDC followed by a quick ramp down of the LAC inductor current ILAC (referred to as "push-pull" action) allows the system to ramp the sum of the inductors currents ILDC+ILAC that feed the output node 814 up and down quickly to produce a positive voltage step at the output. FIG. 12 illustrates push-pull operation of the circuit of FIGS. 8-10. The CONTROL circuit 802 first initiates a push operation, which configures both switching regulators 804, 806 to increase current into the output node 814. Next, the CONTROL circuit 802 initiates a pull operation, which configures both switching regulators 804, 806 to reduce current into the output node 814. By configuring the LAC inductor current ILAC to slew down quickly, the system has the ability to cancel, at the output node 814, the positive current previously built in the LDC inductor.

Figure 13:
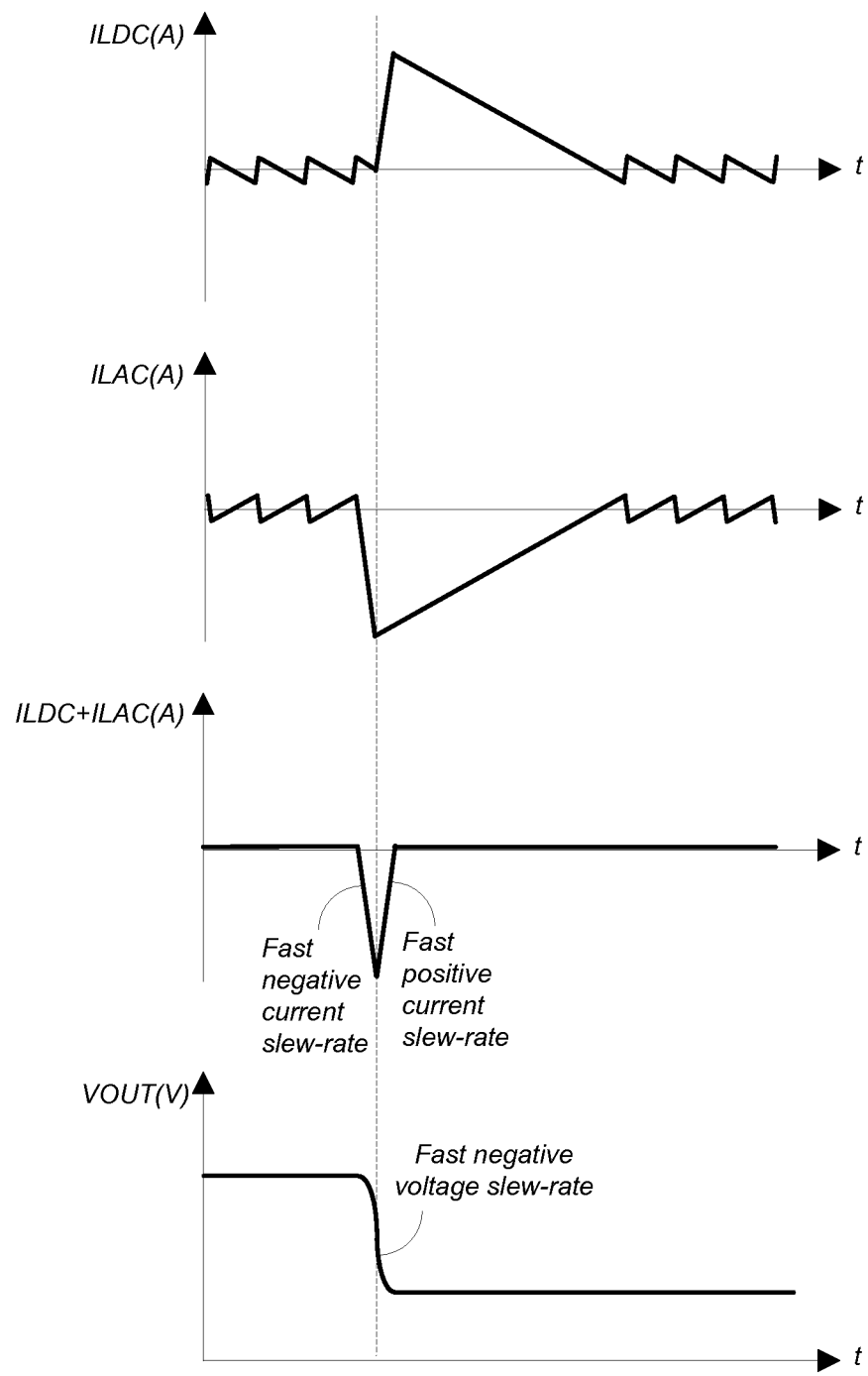
FIG. 13 illustrates pull-push operation of the circuit of FIGS. 8-10.

Conversely, combining a quick ramp down of the LAC inductor current ILAC followed by a quick ramp up of the LDC inductor current ILDC (referred to as "pull-push" action) allows the system to ramp the sum of the inductors currents ILDC+ILAC that feed the output node 814 down and up quickly to produce a negative voltage step at the output node 814. FIG. 13 illustrates pull-push operation of the circuit of FIGS. 8-10. The CONTROL circuit 802 first initiates a pull operation, which configures both switching regulators 804, 806 to decrease current into the output node 814. Next, the CONTROL circuit initiates a push operation, which configures both switching regulators 804, 806 to increase current into the output node 814. By configuring the LDC inductor current ILDC to slew up quickly, the system has the ability to cancel, at the output node 814, the negative current previously built in the LAC inductor.

A push-pull operation may be performed in response to a loading event or a positive voltage step on the reference voltage (VREF). The push-pull action may be performed in 3 steps. First, the CONTROL circuit 802 forces the sum of the inductors currents ILAC+ILDC to slew up quickly by commanding the switches S1 and S3 to short the SWAC and SWDC nodes to VIN. Then, after a time delay, the CONTROL circuit 802 forces the sum of the LAC and LDC inductor currents ILAC+ILDC to slew down quickly by commanding the switches S2 and S4 to short the SWAC and SWDC nodes to ground. Finally, once the sum of the LDC and LAC currents ILAC+ILDC has returned to the load current (e.g., set at 0 in FIG. 12) the CONTROL circuit 802 may drive the switches to bring the LAC current ILAC back to 0 as fast as possible while maintaining the sum of the inductor currents ILAC+ILDC equal to the load current.

Conversely, in response to a off-loading event or a negative voltage step on the reference voltage (VREF) the pull-push action is done in 3 steps. First, the CONTROL circuit 802 forces the sum of the LAC and LDC inductor currents ILAC+ILDC to slew down quickly by commanding the switches S2 and S4 to short the SWAC and SWDC nodes to ground. Then, after a possible time delay, the CONTROL circuit 802 forces the sum of the LAC and LDC inductor currents ILAC+ILDC to slew up quickly by commanding the switches S1 and S3 to short the SWAC and SADC nodes to VIN. Finally, once the sum of the LDC and LAC inductor currents LAC and LDC has returned to the load current (e.g., set at 0 in FIG. 13) the CONTROL circuit 802 drives the switches to bring the LAC current ILAC back to 0 as fast as possible while maintaining the sum of the inductors currents ILAC+ILDC equal to the load current.

Figure 14:
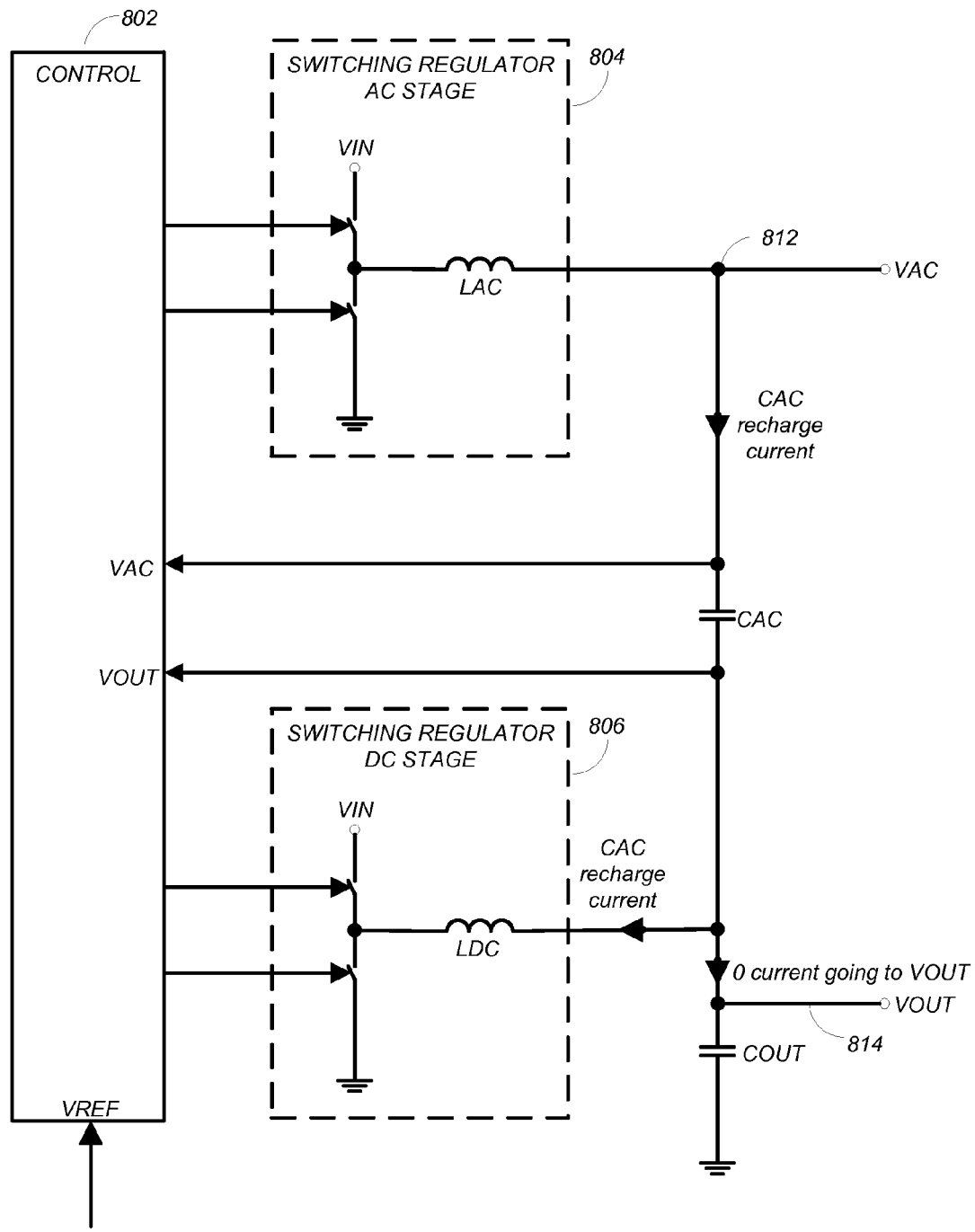
FIG. 14 illustrates a recharge action according to another example embodiment.

FIG. 14 illustrates a recharge action according to another example embodiment. A push-pull or a pull-push action will discharge the CAC capacitor and cause the VAC node 812 voltage to deviate from a set value (e.g., VIN-REF). In order to recharge the CAC capacitor as fast as possible (e.g., in preparation for the next transient) the CONTROL circuit 802 may configure the DC Stage 806 to sink, from the VOUT node 814, an equal current as is sourced to the VAC node 812 by the AC Stage 804. In this way, disturbance on VOUT may be minimized. As illustrated in FIG. 14, the CONTROL circuit 802 may configure the AC Stage 804 to generate a positive CAC recharge current into the top terminal of the CAC capacitor. In order to produce a net zero total output current into the output capacitor, COUT, the CONTROL circuit 802 may also simultaneously configure the DC Stage 806 to generate a negative CAC recharge current out of the bottom terminal of the CAC capacitor.

Figure 15:
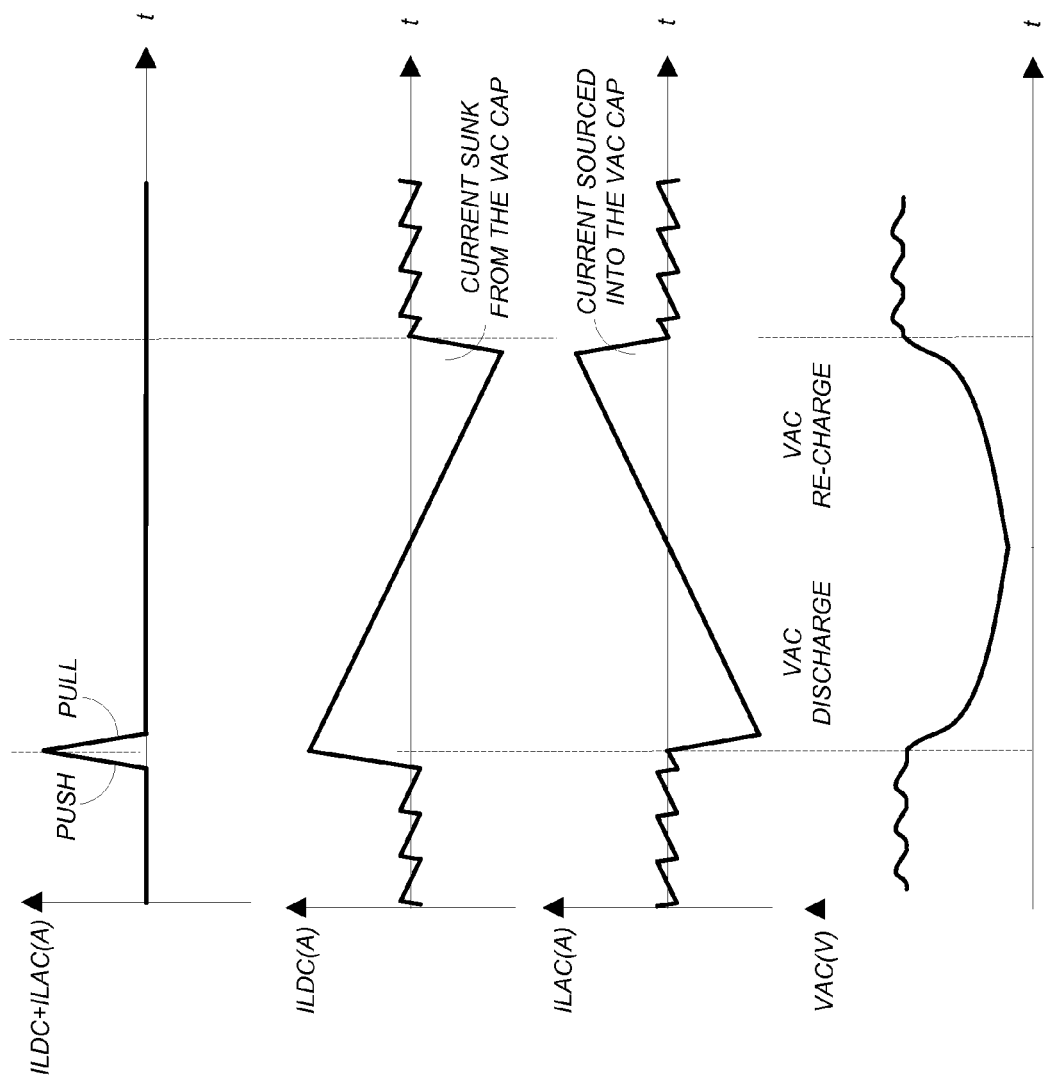
FIGS. 15-16 illustrate push-pull, pull-push, and recharge waveforms for one example implementation.
Figure 16:
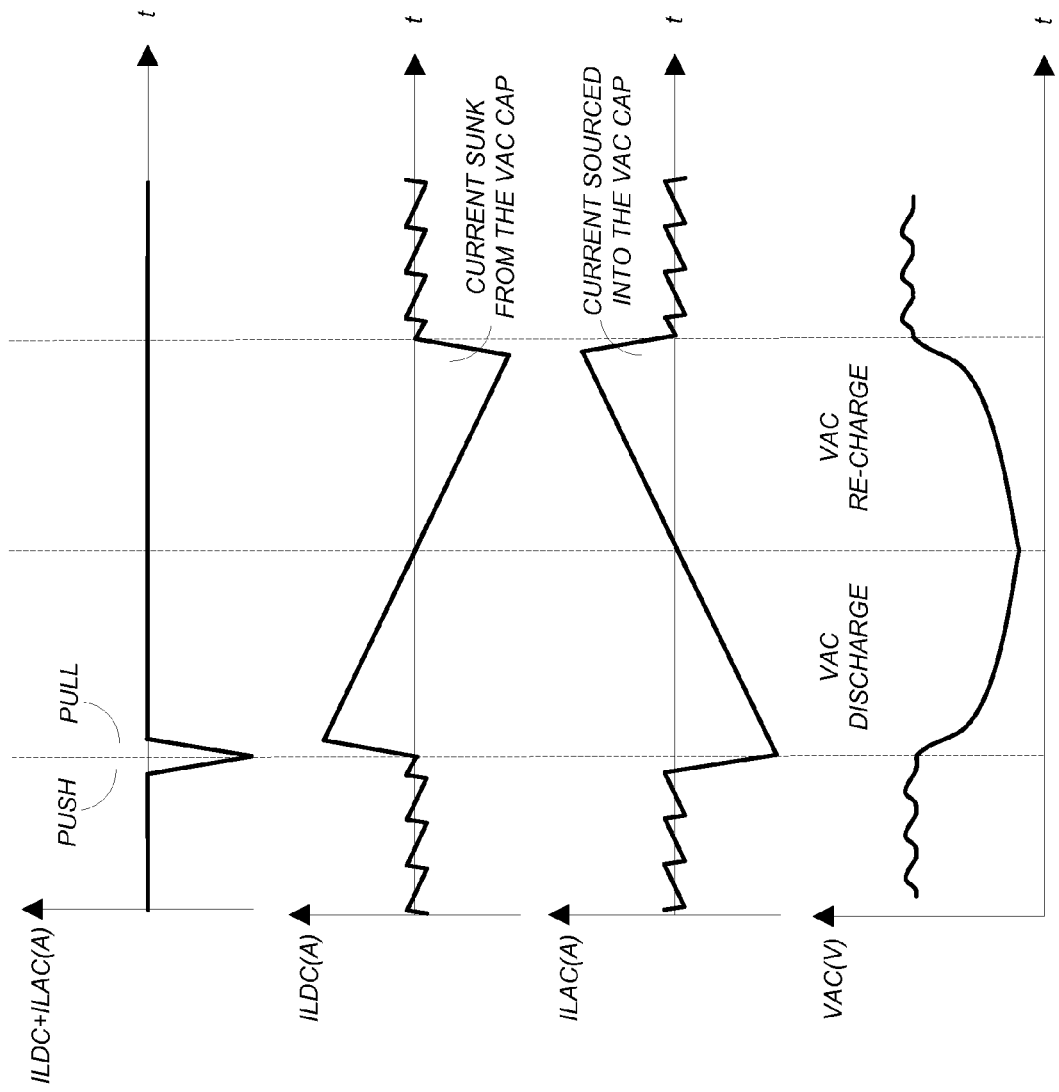

FIGS. 15-16 illustrate push-pull, pull-push, and recharge waveforms for one example implementation. As shown in FIGS. 15-16 when a load transient or output voltage step event occurs and a push-pull or pull-push action is performed, the VAC voltage moves away from the desired VIN-VREF voltage. This is illustrated in FIGS. 15-16 as VAC dropping below its nominal value of VIN-VREF. It may be desirable in some applications for the system to recover as fast as possible from a previous transient by quickly bringing the VAC node 812 voltage back to its VIN-VREF value in preparation for the next transient.

The recharge of the VAC node 812 may be done without disturbing the regulation of the output voltage (VOUT). To accomplish this, a current may be sourced into the VAC node 812 by the LAC inductor while the same current with the opposite polarity may be sunk from the VOUT node 814 by the LDC inductor. Both the sourced current (from the LAC inductor) and the sunk current (from the LDC inductor) cancel each other at the VOUT output node 814. Therefore, the VOUT node 814 voltage is not affected by the slewing of the voltage across the CAC capacitor. The recharge phase of the process is illustrated in FIGS. 15-16 as the point where inductor currents ILDC and ILAC cross their nominal values after the push-pull/pull-push pulses. Rather than returning to steady state operation, the CONTROL circuit 802 configures the AC Stage 804 to cause the LAC inductor current ILAC to continue to increase and the CONTROL circuit 802 configures the DC Stage 806 to cause the LDC inductor current ILDC to continue to decrease. The recharge action is complete at the point where the voltage across the CAC capacitor is such that the VAC node 812 voltage has returned to its nominal value. The system then returns to steady state.

Figure 17:
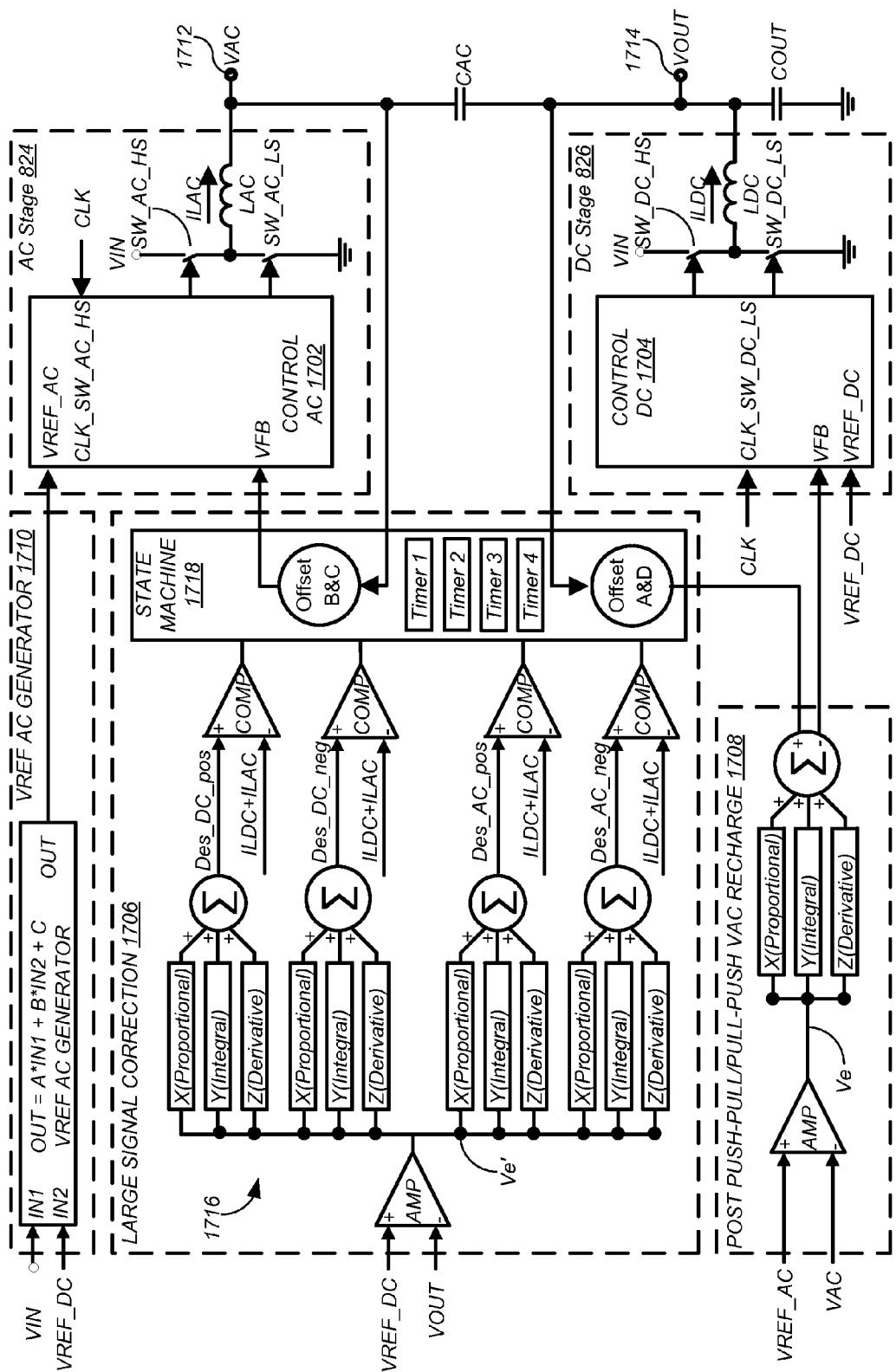
FIG. 17 illustrates one example implementation of an embodiment.

FIG. 17 illustrates one example implementation of an embodiment. The system includes an AC control block 1702, a DC control block 1704, a LARGE SIGNAL CORRECTION block 1706, a VREF AC GENERATOR 1710, and a POST PUSH-PULL/PULL-PUSH VAC RECHARGE block 1708.

The AC control block 1702, together with the switches SW_AC_HS and SW_AC_LS, form a conventional step-down switching regulator including a reference voltage input, VREF_AC, a feedback voltage input, VFB, and a clock input, CLK, controlling the switch SW_AC_HS (e.g., to turn on). The AC control block 1702 regulates the VAC node 1712 at VREF_AC (e.g., VIN−VREF) when the LARGE SIGNAL CORRECTION block 1706 is not active. The regulation of the VAC node 1712 when the LARGE SIGNAL CORRECTION block 1706 is active is described below.

The DC control block 1704, together with the switches SW_DC_HS and SW_DC_LS, forms a conventional step-down switching regulator that includes a reference voltage input, VREF_DC, a feedback voltage input, VFB, and a clock input, CLK, controlling the switch SW_DC_LS (e.g., to turn on). When the LARGE SIGNAL CORRECTION block 1706 is not active, the DC control block 1704 regulates the VOUT node at VREF_DC. The regulation of the VOUT node 1714 when the LARGE SIGNAL CORRECTION block 1706 is active is described below.

The VREF AC GENERATOR 1710 generates a VREF_AC reference voltage at the ControlAC VREF_AC input of the AC control block 1702, and is defined as a function of VIN and VREF_DC (i.e., f(VIN, VREF_DC). The following is one example function of VIN and VREF_DC:

$$VREF\_AC = A \times Vin + B \times VREF\_DC + C$$

A, B and C are coefficients. As described for one example above, the following values may be used: A=1, B=−1, and C=0. Thus, VREF_AC will receive the following voltage:

$$VREF\_AC = Vin - VREF\_DC,$$

which will configure the AC Stage 824 to maintain a controlled voltage on the VAC node 1712 of VIN−VREF_DC, where VREF_DC=VOUT in this example.

In this example, the LARGE SIGNAL CORRECTION block 1706 implements the push-pull and pull-push actions explained above. The LARGE SIGNAL CORRECTION block 1706 senses the output, VOUT, and input reference, VREF_DC, signals to detect a reference or load step. In one embodiment, push-pull and pull-push may be implemented by generating 4 current thresholds: (Des_AC_pos), (Des_AC_neg), (Des_DC_pos) and (Des_DC_neg). Intuitively, the four current thresholds each represent a desired value of the sum of the LAC and LDC inductor currents ILAC+ILDC. The AC and DC naming convention is used because each one of the current thresholds is compared against the sum of the LAC and LDC inductor output currents ILAC+ILDC (e.g., the total output current) and each comparison acts either on the AC Stage 824 or the DC Stage 826. The four current thresholds are used to detect regulation failure, for example, when the sum of the currents of the inductors ILAC+ILDC is not appropriate and a push or a pull action is required to reestablish regulation.

In this example, each of the current thresholds may be formed by a controller 1716 using combination of a Proportional, an Integral and an Derivative term of the error signal Ve'=(VOUT−VREF_DC), as follows:

$$IDES = X \cdot Ve' + Y \cdot \int Ve' dt + Z \cdot \frac{dVe'}{dt}$$

X, Y, Z are system coefficients. Each one of the four current thresholds may be generated with a different set of X, Y, Z coefficients. The Proportional term depends on the present (instantaneous) error, the Integral term on an accumulation of past errors, and the Differential term on the prediction of future errors. Proportional, Integral, Derivative feedback control calculates an error value as the difference between a measured process variable and its desired value (e.g., VREF_DC−VOUT). The controller 1716 attempts to minimize the error by adjusting the control inputs.

Large signal correction 1706 compares each one of the current thresholds with the sum of the inductor currents Isum=(ILDC+ILAC) to trigger the 4 different cases (A(Push), B(Pull), C(Pull), and D(Push)) to perform the Push-Pull and Pull-Push actions described above. The inductor currents ILDC and ILAC may be sensed using current sense circuitry (not shown), for example. Table 1 illustrates the conditions for producing a push/pull or pull/push operation.

TABLE 1

| Case | Condition | Action |
|---|---|---|
| A (Push) | Isum < {Des_DC_pos} & C has not taken place in the last (timer1) | CONTROL DC (VFB) low |
| B (Pull) | Isum > { Des_AC_pos } & A has taken place in the last (timer2) | CONTROL AC (VFB) high |
| C (Pull) | Isum > { Des_AC_neg } & A has not taken place in the last (timer3) | CONTROL AC (VFB) high |
| D (Push) | Isum < { Des_DC_neg } & C has taken place in the last (timer4) | CONTROL DC (VFB) low |

Figure 18:
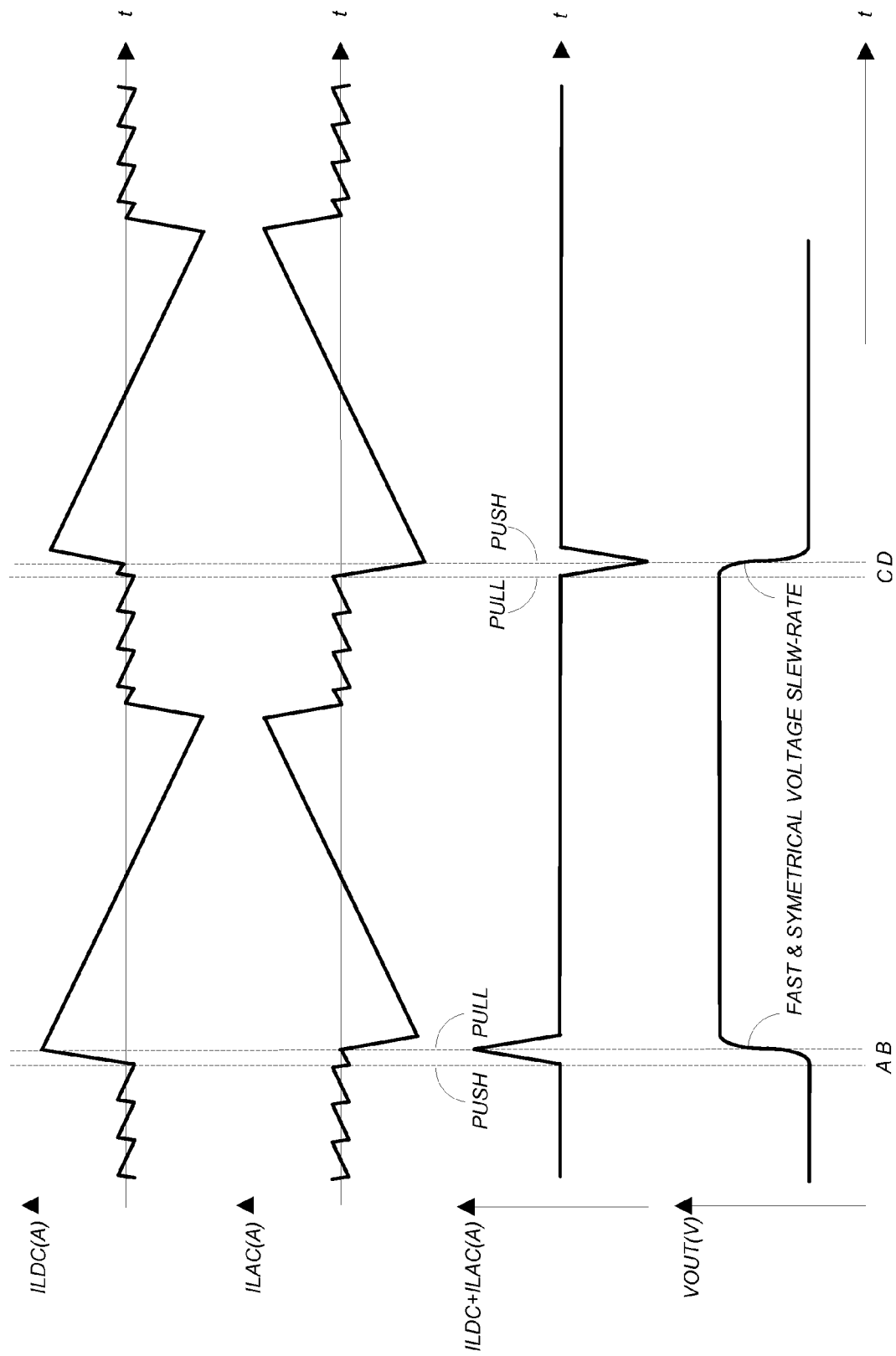
FIG. 18 illustrates push-pull and pull-push waveforms marked with the cases A, B, C and D.

Table 1 summarizes the state-machine conditions leading to the push-pull and pull-push actions. FIG. 18 illustrates push-pull and pull-push waveforms marked with the cases A, B, C and D.

Note that delay elements (not shown in FIG. 17) can be implemented in the state machine to force a delay between the end of a push and the beginning of a pull in a push-pull action, and also between the end of a pull and the beginning of a push in a pull-push action.

If the output voltage is commanded to step up (e.g., if VREF_DC is stepped up), then VREF_DC will increase above VOUT, and Des_DC_pos will be greater than ILDC+ILAC, which triggers Case A. In this example, an additional constraint that Case C has not taken place for at least some specified period of time (e.g., timer1) sets a minimum time that a push-pull may follow a pull-push. Case A causes VFB for the DC Stage 826 to be driven low, forcing a positive current slew from the DC Stage 826. A pull (Case B) occurs when the total output current Isum is greater than Des_AC_pos and Case A (a push) has taken place within a specified time period (e.g., timer2). The AC Stage 824 then is commanded to produce a negative current slew (Case B), for example. Case B causes VFB for the AC Stage 824 to be driven high, forcing a negative current slew from the AC Stage 824. In this way, a positive current pulse is created and pushed to the output node 1714. The pulse duration is dependent on finite slew times (±Vin/L) and the delay between events A and B, which are adjusted for a target net positive slew rate.

If the output voltage is commanded to step down (e.g., if VREF_DC is stepped down), then VREF_DC will decrease below VOUT, and Des_AC_neg will be less than ILDC+ILAC, which triggers Case C. In this example, an additional constraint that Case A has not taken place for at least some specified period of time (e.g., timer3) sets a minimum time that a pull-push may follow a push-pull. Case C causes VFB for the AC Stage 824 to be driven high, forcing a negative current slew from the AC Stage 824. A push (Case D) occurs when the total output current Isum is less than Des_DC_neg and Case C (a pull) has taken place within a specified time period (e.g., timer4). Case D causes VFB for DC Stage 826 to be driven low, forcing a positive current slew from the DC Stage 826. In this way, a negative current pulse is created and pulled from the output node 1714. The pulse duration is dependent on finite slew times (±Vin/L) and the delay between Cases C and D, which are adjusted for a target net negative slew rate.

This example implementation forces only the inductor featuring the highest current slew-rate (in the required direction) to slew for each one of the A, B, C and D cases. However, in another embodiment, the system could be designed to also force the opposite stage with the lower current slew-rate (in the required direction) to slew for each one of those 4 cases.

As explained above, a push-pull or a pull-push event will discharge the CAC cap and the VAC node 1712 voltage deviates from (VIN-REF). In order to recharge as fast as possible, in preparation for the next transient, the ControlDC regulator may sink from the VOUT node 1714 an equal current as is sourced to the VAC node 1712 by the ControlAC regulator. The POST PUSH-PULL/PULL-PUSH VAC RECHARGE block 1708 adds a signal (or offset) on top of the VOUT voltage and feeds the sum to the ControlDC feedback node. This forces the LDC inductor to sink the CAC recharge current as described above. In this example, the added signal has PID form and is generated as follows:

$$X \cdot Ve + Y \cdot \int Ve \, dt + Z \cdot \frac{dVe}{dt}$$

where X, Y and Z are coefficients unique to this recharge function and may be set to match the transfer function of the ControlAC switching regulator 824. In this example, the POST PUSH-PULL/PULL-PUSH VAC RECHARGE block 1708 includes an error amplifier AMP that receives VREF_AC (e.g., the desired value of the VAC node 1712, VIN−VREF) and VAC (e.g., the actual voltage at the VAC node 1712) and produces an error signal, Ve. Proportional, Integral, and Derivative terms may be determined and combined to generate the appropriate signal in the DC Stage 826 feedback loop to drive the feedback input of the ControlDC block 1704, which in turn drives switches SW_DC_HS and SW_DC_LS to sink a current to offset the current used to recharge the CAC capacitor.

Various embodiments can be extended to various forms of multi-phase architectures. As for a conventional step-down regulator, a multi-phase architecture presents several advantages, such as: 1) reducing the current level of individual power switch and inductors; 2) offering higher current slew rates and lower voltage ripple, when operated out of phase.

Figure 19:
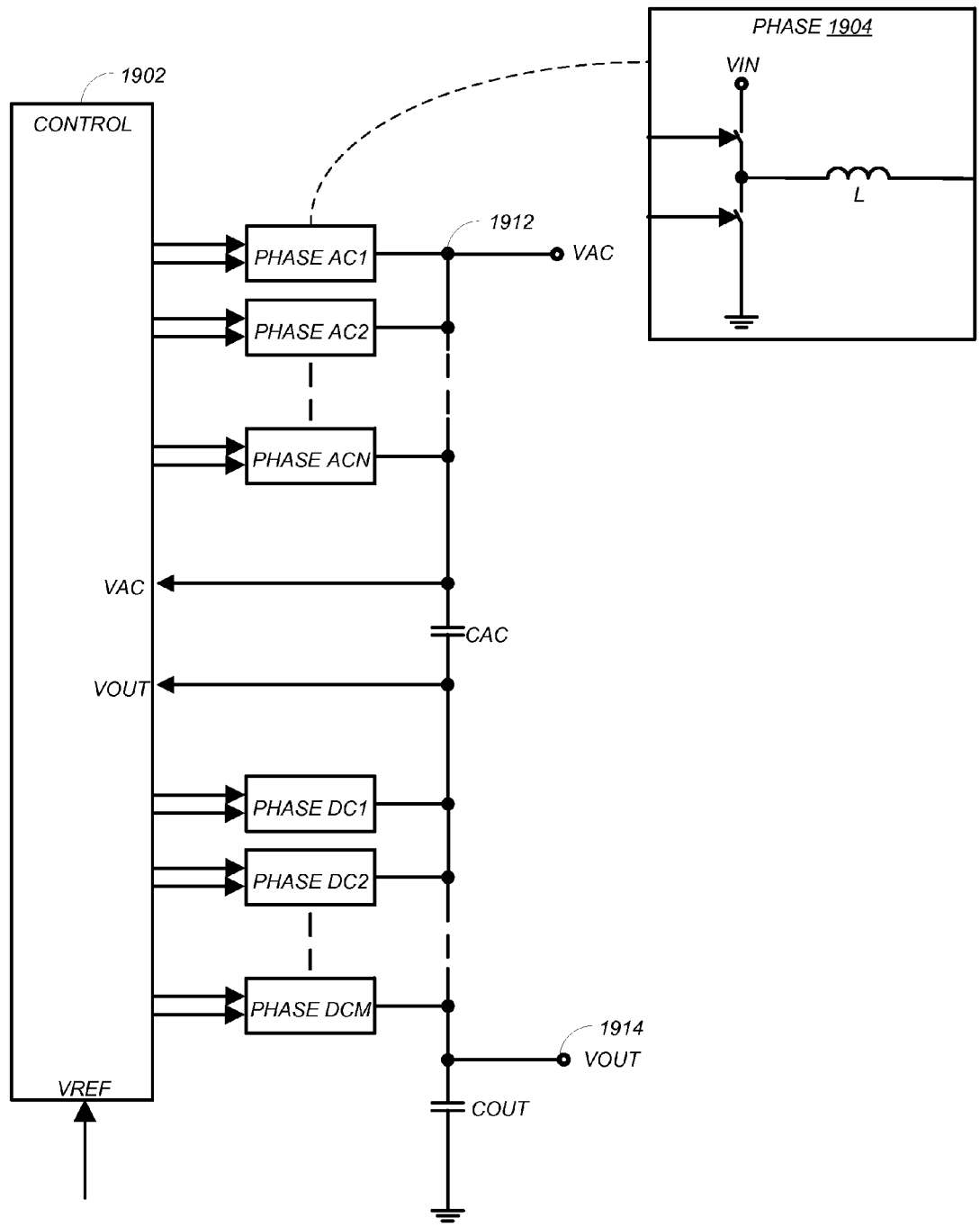
FIG. 19 shows a first multi-phase implementation example where N AC inductors are connected to the node VAC and M DC inductors are connected to the VOUT output node.

FIG. 19 shows a first multi-phase implementation example where N AC inductors L are connected to the node VAC and M DC inductors L are connected to the VOUT output node 1914. In particular, the implementation includes N AC phases PHASE AC1 through PHASE ACN, and M DC phases PHASE DC1 through PHASE DCM. Each of the AC phases and DC phases is implemented as shown at 1904. Note that each inductor L may have a different inductance value.

Figure 20:
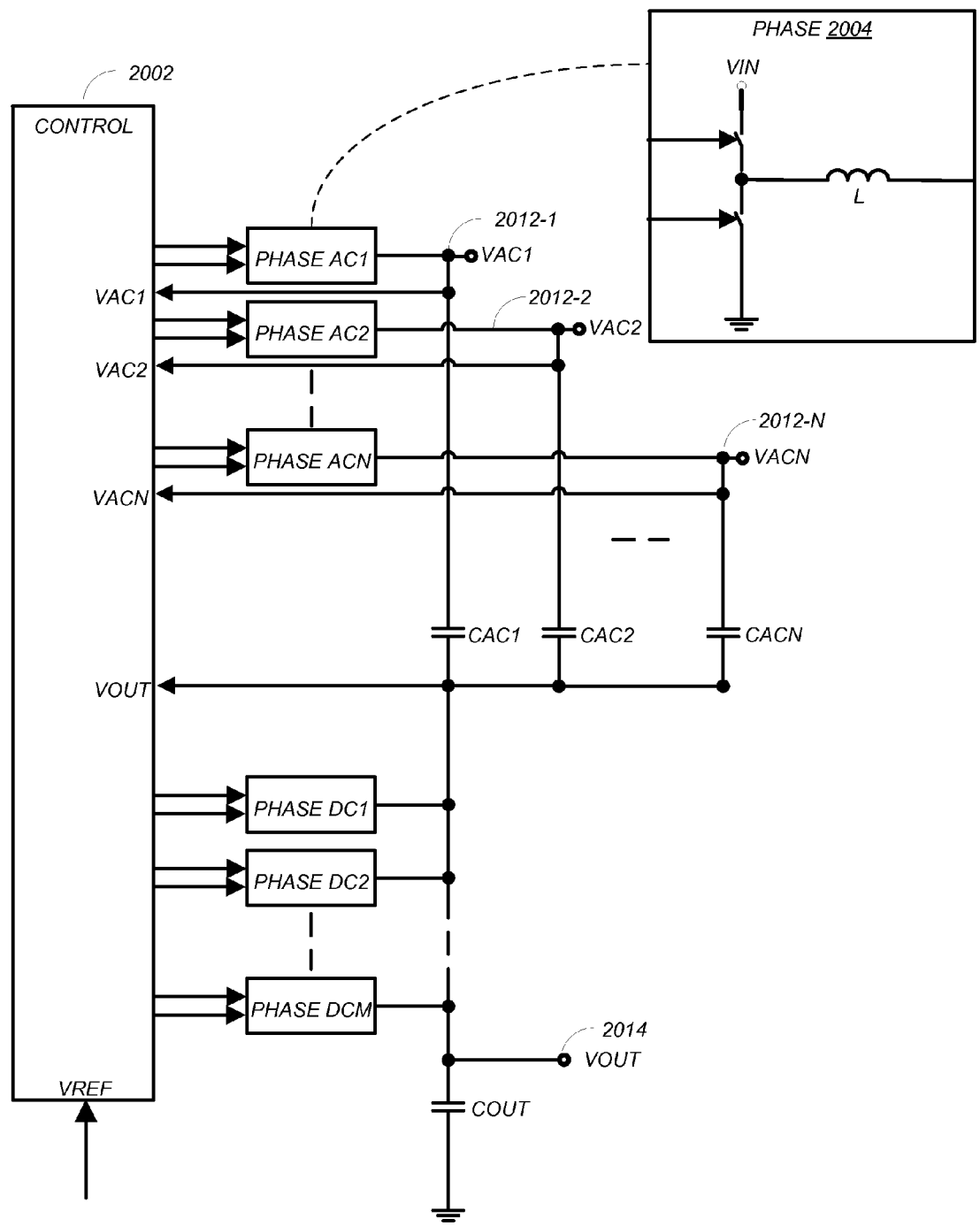
FIG. 20 shows a second multi-phase implementation example where N AC inductors are connected to N VAC nodes, and M DC inductors are connected to the VOUT output node.

FIG. 20 shows a second multi-phase implementation example where N AC inductors are connected to N VAC nodes 2012-1 through 2012-N, and M DC inductors are connected to the VOUT output node 2014. In particular, the implementation includes N AC phases PHASE AC1 through PHASE ACN, and M DC phases PHASE DC1 through PHASE DCM. Each of the AC phases and DC phases is implemented as shown at 2004. Note that each inductor L may have a different inductance value.

Figure 21:
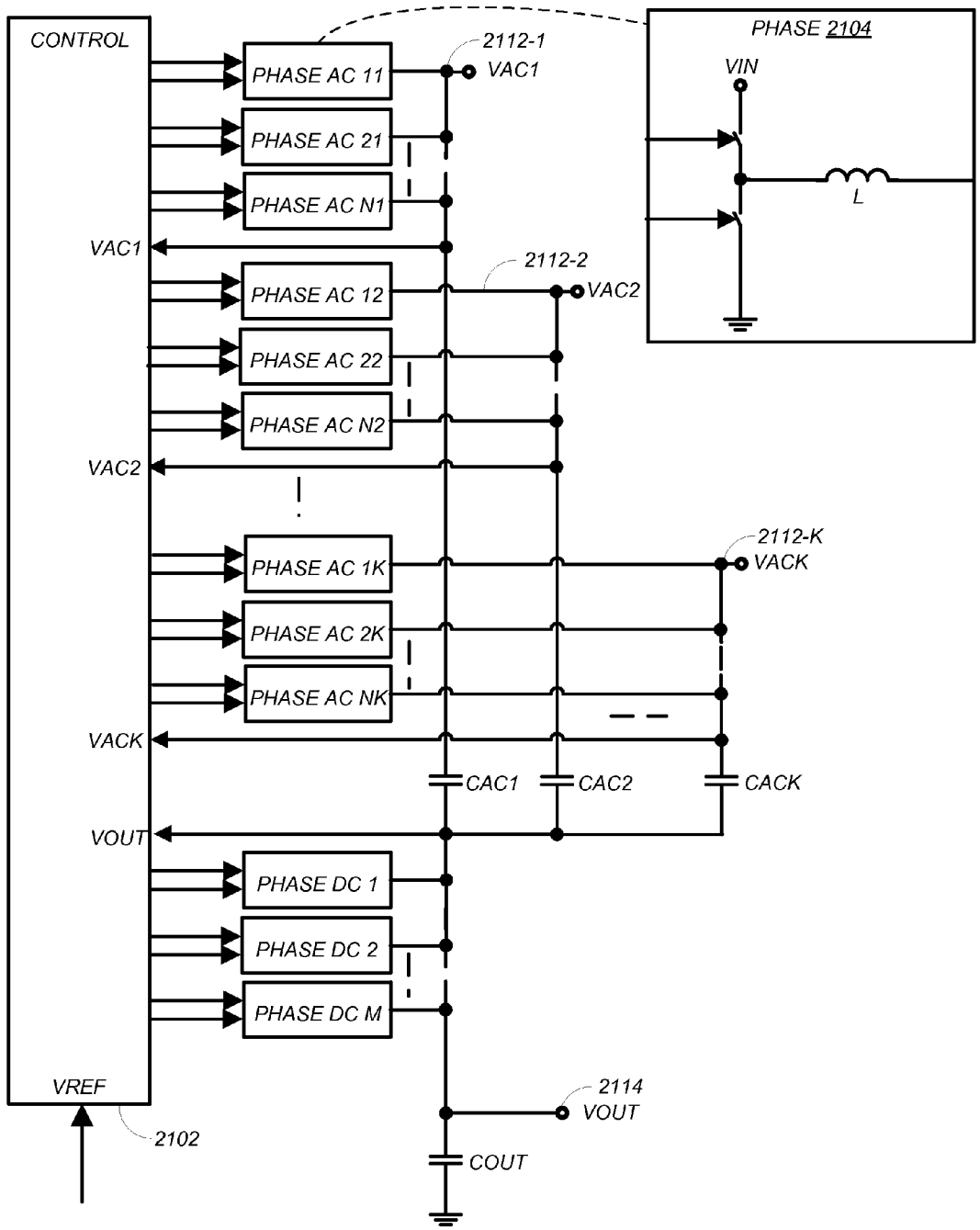
FIG. 21 shows a third multi-phase implementation example with K groups of N AC inductors and M DC inductors.

FIG. 21 shows a third multi-phase implementation example with K groups of N AC inductors and M DC inductors. Each DC inductor is connected to a VOUT output node 2114. Each one of the K groups of N AC inductors is connected to a respective one of VAC nodes 2112-1 through 2112-K. Each of the K nodes 2112 is connected by a respective one of capacitors CAC1 through CACK to the VOUT output node 2114. In particular, the implementation includes N×K AC phases PHASE AC11 through PHASE ACNK, and M DC phases PHASE DC1 through PHASE DCM. Each of the AC phases and DC phases is implemented as shown at 2104. Note that each inductor L may have a different inductance value. In some embodiments, the K groups of AC phase might include different numbers of PHASE AC.

Figure 22:
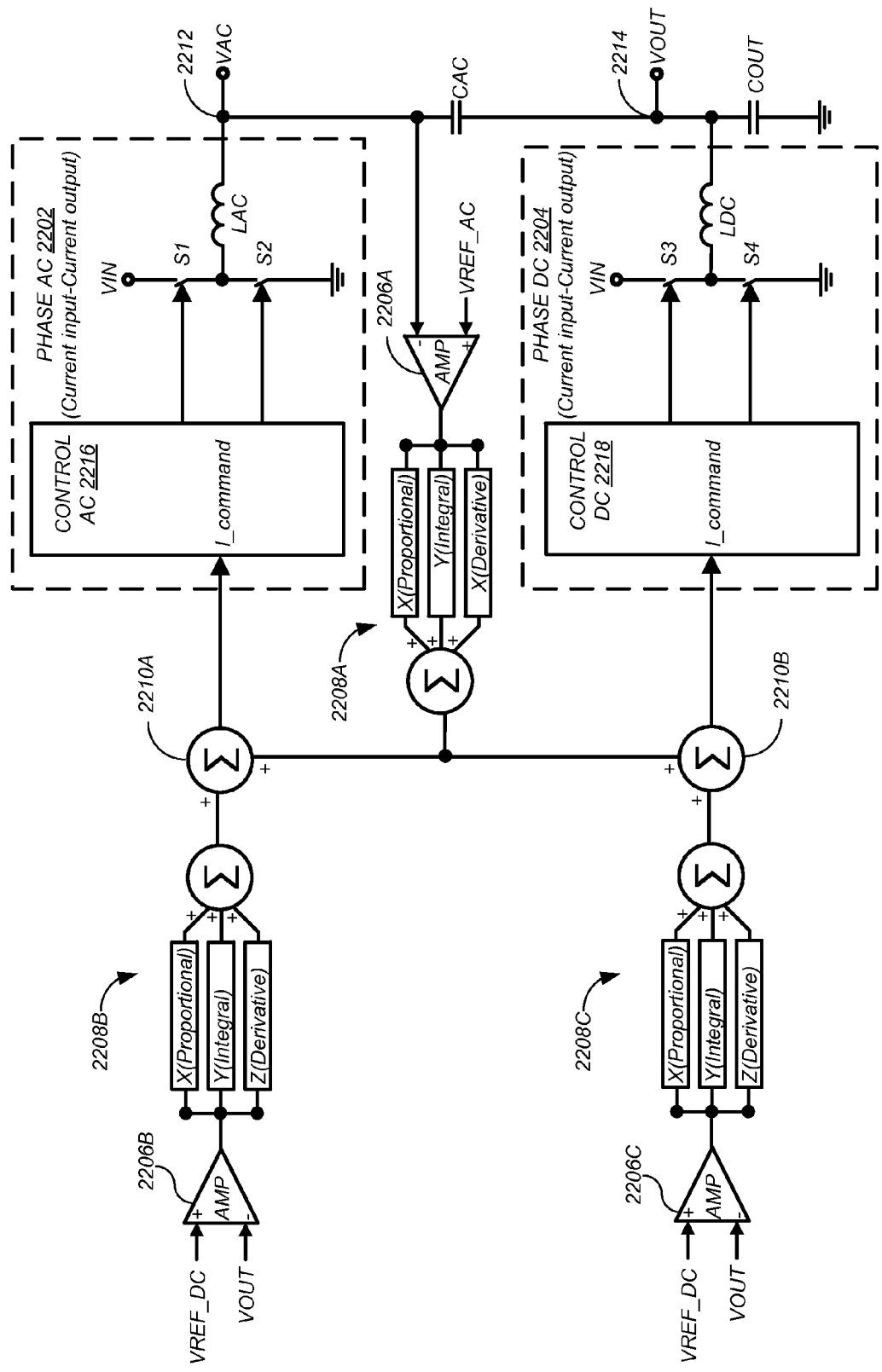
FIG. 22 illustrates another embodiment.

FIG. 22 illustrates another embodiment. The system includes two current input/current output switching regulators PHASE AC 2202 and PHASE DC 2204, three amplifiers 2206A, 2206B, and 2206C each driving a respective PID element (Proportional, Integral and Derivative summing element) 2208A, 2208B, and 2208C, and two summing elements 2210A and 2210B. The VAC output node 2212 of the PHASE AC 2202 is connected to the VOUT output node 2214 of the PHASE DC 2204 through a capacitor CAC. The VOUT output node 2214 is also connected to the system ground through a capacitor COUT. Each switching regulator 2202, 2204 respectively includes a controller 2216, 2218, two power switches S1, S2, S3, S4 and an output inductance LAC, LDC.

The current command of the PHASE AC switching regulator 2202 is the sum of two components: the difference between VOUT and VREF_DC (amplified by the amplifier 2206B and then processed by the PID element 2208B) and the difference between VAC and VREF_AC (amplified by the amplifier 2206A and then processed by the PID element 2208A). The current command of the PHASE DC switching regulator 2204 is the sum of two components: the difference between VOUT and VREF_DC (amplified by the amplifier 2206C and then processed by the PID element 2208C) and the difference between VAC and VREF_AC (amplified by the amplifier 2206A and then processed by the PID element 2208A). Note that each PID element 2208 may use a different set of parameters for the linear, derivative, integral and integration constant parameters. Similarly, each of the three amplifiers 2206 can be set up with a different gain term.

The embodiment of FIG. 22 provides a very linear response and achieves a fast and symmetrical regulation of the VOUT output node 2214 by providing a push-pull and push-pull actions when it is required. The linear nature of this implementation makes it very easy to stabilize. Note that this implementation can easily be converted to voltage mode and/or multi-phase.

One embodiment includes an apparatus comprising a first switching regulator coupled to an output node, a second switching regulator coupled to the output node through a capacitor, the capacitor having a first terminal coupled to the output node and a second terminal coupled to the second switching regulator, wherein the first switching regulator has a feedback input coupled to a first terminal of the capacitor to control a voltage on the output node and the second switching regulator has a second feedback input coupled to the second terminal of the capacitor to control a voltage on the second terminal of the capacitor.

Another embodiment includes an apparatus comprising a first switching regulator having an input to receive an input voltage, the first switching regulator coupled to an output node, the first switching regulator having a first control loop to control the voltage on the output node, a second switching regulator having an input to receive the input voltage, the second switching regulator coupled to the output node through a capacitor, the capacitor having a first terminal coupled to the output node and a second terminal coupled to the second switching regulator, the second switching regulator having a second control loop to control the voltage on the second terminal of the capacitor, wherein the first control loop maintains the voltage on the output node at a first voltage, and wherein the second control loop maintains the voltage on the second terminal of the capacitor at a second voltage that is a function of the input voltage and the first voltage.

Figure 23:
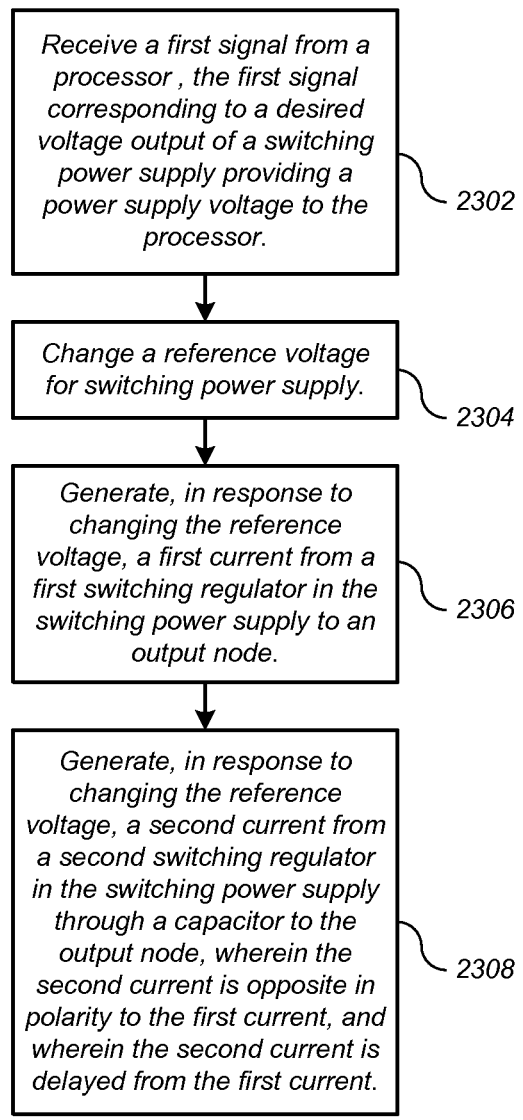
FIG. 23 shows a process according to one embodiment.

FIG. 23 shows a process according to one embodiment. Although in the described embodiments the elements of the process are presented in one arrangement, other embodiments may feature other arrangements. For example, in various embodiments, some or all of the elements of the process can be executed in a different order, concurrently, and the like. Also some elements of the process may not be performed, and may not be executed immediately after each other. In addition, some or all of the elements of the process can be performed automatically, that is, without human intervention.

Referring to FIG. 23, the process may include, at 2302, receiving a first signal from a processor, the first signal corresponding to a desired voltage output of a switching power supply providing a power supply voltage to the processor. The process may include, At 2304, changing a reference voltage for the switching power supply. At 2306, the process includes generating, in response to said changing the reference voltage, a first current from a first switching regulator in the switching power supply to an output node. At 2308, the process includes generating, in response to said changing the reference voltage, a second current from a second switching regulator in the switching power supply through a capacitor to the output node, wherein the second current is opposite in polarity to the first current, and wherein the second current is delayed from the first current.

Figure 24:
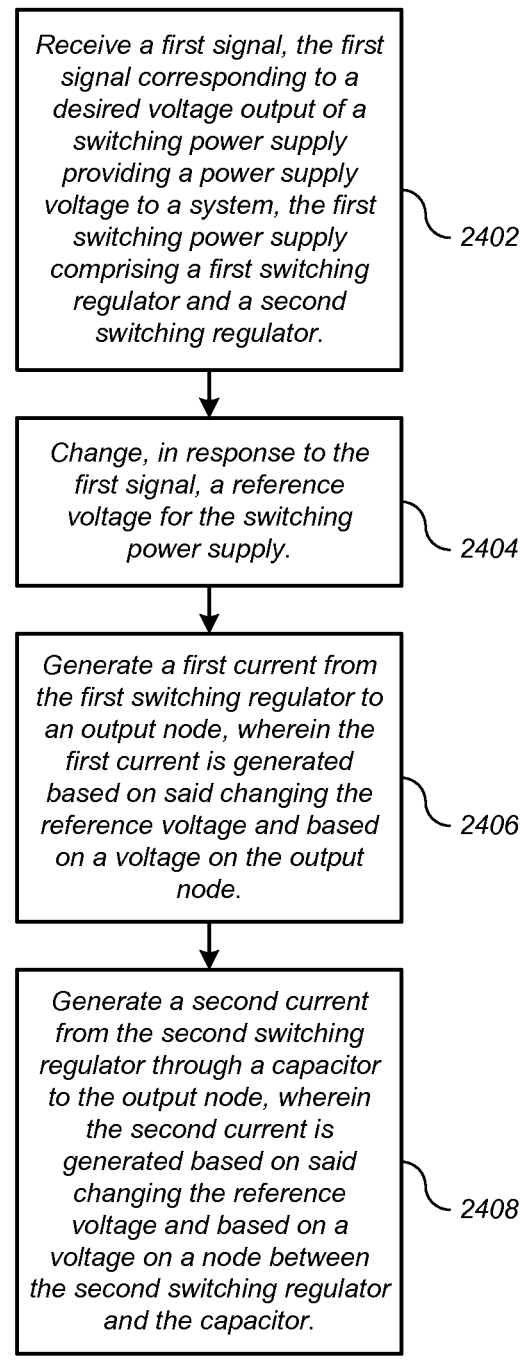
FIG. 24 shows a process according to one embodiment.

FIG. 24 shows a process according to one embodiment. Although in the described embodiments the elements of the process are presented in one arrangement, other embodiments may feature other arrangements. For example, in various embodiments, some or all of the elements of the process can be executed in a different order, concurrently, and the like. Also some elements of the process may not be performed, and may not be executed immediately after each other. In addition, some or all of the elements of the process can be performed automatically, that is, without human intervention.

Referring to FIG. 24, the process may include, at 2402, receiving a first signal, the first signal corresponding to a desired voltage output of a switching power supply providing a power supply voltage to a system, the first switching power supply comprising a first switching regulator and a second switching regulator. The process may include, at 2404, changing, in response to the first signal, a reference voltage for the switching power supply. The process may include, at 2406, generating a first current from the first switching regulator to an output node, wherein the first current is generated based on said changing the reference voltage and based on a voltage on the output node. The process may include, at 2408, generating a second current from the second switching regulator through a capacitor to the output node, wherein the second current is generated based on said changing the reference voltage and based on a voltage on a node between the second switching regulator and the capacitor.

Figure 25:
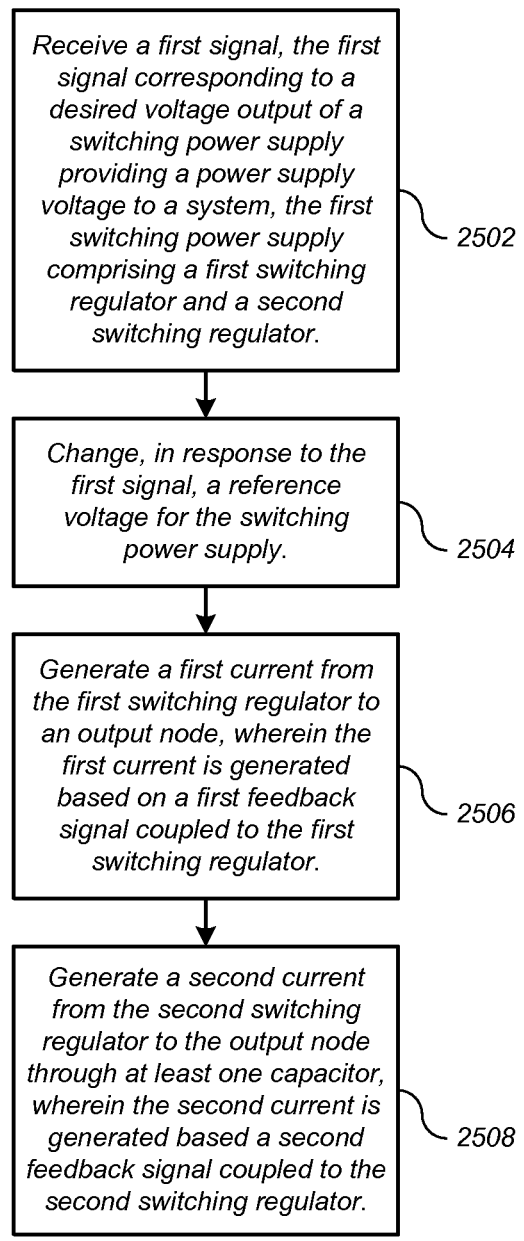
FIG. 25 shows a process according to one embodiment.

FIG. 25 shows a process according to one embodiment. Although in the described embodiments the elements of the process are presented in one arrangement, other embodiments may feature other arrangements. For example, in various embodiments, some or all of the elements of the process can be executed in a different order, concurrently, and the like. Also some elements of the process may not be performed, and may not be executed immediately after each other. In addition, some or all of the elements of the process can be performed automatically, that is, without human intervention.

Referring to FIG. 25, the process may include, at 2502, receiving a first signal, the first signal corresponding to a desired voltage output of a switching power supply providing a power supply voltage to a system, the first switching power supply comprising a first switching regulator and a second switching regulator. The process may include, at 2504, changing, in response to the first signal, a reference voltage for the switching power supply. The process may include, at 2506, generating a first current from the first switching regulator to an output node, wherein the first current is generated based on a first feedback signal coupled to the first switching regulator. The process may include, at 2508, generating a second current from the second switching regulator to the output node through at least one capacitor, wherein the second current is generated based a second feedback signal coupled to the second switching regulator.

Figure 26:
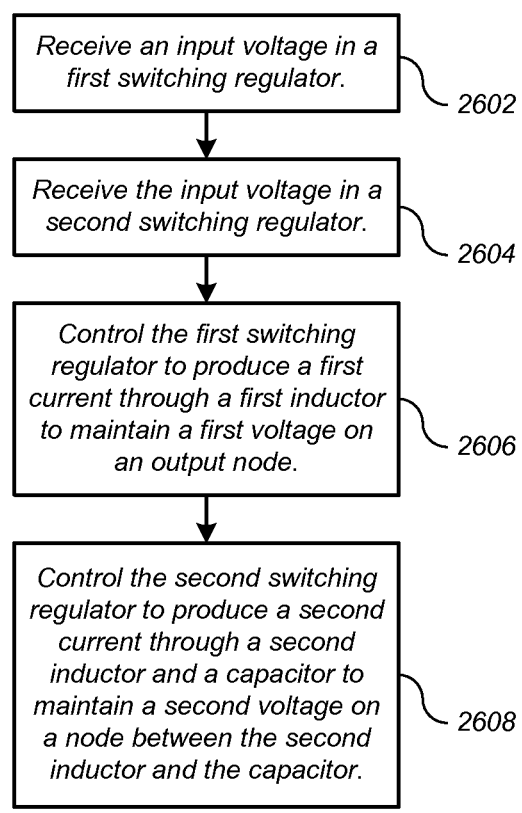
FIG. 26 shows a process according to one embodiment.

FIG. 26 shows a process according to one embodiment. Although in the described embodiments the elements of the process are presented in one arrangement, other embodiments may feature other arrangements. For example, in various embodiments, some or all of the elements of the process can be executed in a different order, concurrently, and the like. Also some elements of the process may not be performed, and may not be executed immediately after each other. In addition, some or all of the elements of the process can be performed automatically, that is, without human intervention.

Referring to FIG. 26, the process may include, at 2602, receiving an input voltage in a first switching regulator. The process may include, at 2604, receiving the input voltage in a second switching regulator. The process may include, at 2606, controlling the first switching regulator to produce a first current through a first inductor to maintain a first voltage on an output node. The process may include, at 2608, controlling the second switching regulator to produce a second current through a second inductor and a capacitor to maintain a second voltage on a node between the second inductor and the capacitor.

In one embodiment, the second voltage is a function of the input voltage and the first voltage.

In one embodiment, the second voltage is equal to a difference between the input voltage and the first voltage.

In one embodiment, the first switching regulator produces the first current and the second switching regulator produces the second current in response to a change in a reference signal.

In one embodiment, the first switching regulator produces the first current and the second switching regulator produces the second current in response to a change in a load current.

In one embodiment, the method further comprises controlling the first switching regulator to generate a first capacitor recharge current and controlling the second switching regulator to generate a second capacitor recharge current, wherein the sum of the first capacitor recharge current and the second capacitor recharge current is approximately zero.

Another embodiment includes an apparatus comprising a first switching regulator comprising a first control loop, a second switching regulator comprising a second control loop, and a capacitor. An output of the second switching regulator is coupled to an output of the first switching regulator through the capacitor, and the first control loop controls a voltage at the output of the first switching regulator and the second control loop controls a voltage at the output of the second switching regulator.

In one embodiment, the first control loop comprises a first reference voltage for setting a first voltage on the output of the first switching regulator, and wherein the second control loop comprises a second reference voltage for setting a second voltage on the output of the second switching regulator, wherein the first and second voltages establish a voltage difference across the capacitor.

In one embodiment, the first control loop comprises a first circuit for introducing a first offset to generate a first current in the first switching regulator, and wherein the second control loop comprises a second circuit for introducing a second offset to generate a second current in the second switching regulator, wherein the first and second offsets are introduced in response to a change in a load current or in response to a signal triggering a change in the voltage at the output of the first switching regulator.

Another embodiment includes an apparatus comprising a first switching regulator comprising a first control loop, a second switching regulator comprising a second control loop having an output coupled to the first switching regulator through a capacitor, and wherein the first control loop controls a voltage at the output of the first switching regulator and the second control loop controls a voltage at the output of the second switching regulator, wherein, in response to a change in a load current or in response to a change in the voltage at the output of the first switching regulator, the first switching regulator generates a first current to a load having a first polarity and the second switching regulator, after a delay, generates a second current to the load having a second polarity opposite the first polarity.

The above description illustrates various embodiments along with examples of how aspects of the embodiments may be implemented. The above examples and embodiments should not be deemed to be the only embodiments, and are presented to illustrate the flexibility and advantages of the various embodiments as defined by the following claims. Based on the above disclosure and the following claims, other arrangements, embodiments, implementations and equivalents will be evident to those skilled in the art and may be employed without departing from the spirit and scope of the embodiments as defined by the claims.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus comprising:
    a first switching regulator coupled to an output node;
    a second switching regulator coupled to the output node through a capacitor, wherein the capacitor comprises
    a first terminal coupled to the output node, and
    a second terminal coupled to the second switching regulator; and
    a controller configured to regulate a voltage on the output node, wherein the controller comprises
    a first feedback input coupled to the first terminal of the capacitor, and
    a second feedback input coupled to the second terminal of the capacitor;
    wherein the controller is further configured to regulate a voltage on the second terminal of the capacitor,
    wherein the first switching regulator is configured to produce a first current slew rate and the second switching regulator is configured to produce a second current slew rate, and wherein the first current slew rate is different than the second current slew rate.

2. The apparatus of claim 1, wherein the regulated voltage on the second terminal of the capacitor is equal to a difference between an input voltage and the regulated voltage on the output node.

3. The apparatus of claim 1:
    wherein the first switching regulator produces a first current through a first inductor in response to a change in a reference signal; and
    the second switching regulator produces the second current through a second inductor in response to the change in the reference signal.

4. The apparatus of claim 1:
    wherein the first switching regulator produces the first current through a first inductor in response to a change in a load current; and
    the second switching regulator produces the second current through a second inductor in response to the change in the load current.

5. The apparatus of claim 1, wherein the first switching regulator generates a first capacitor recharge current and the second switching regulator generates a second capacitor recharge current, wherein a sum of the first capacitor recharge current and the second capacitor recharge current is approximately zero.

6. The apparatus of claim 1, wherein a first input voltage to the first switching regulator is equal to a second input voltage to the second switching regulator.

7. The apparatus of claim 1, wherein the first current slew rate corresponds to a rate of change in a first current through a first inductor and the second current slew rate corresponds to a rate of change in a second current through a second inductor.

8. The apparatus of claim 1, wherein a duty cycle of a first inductor in the first switching regulator is controlled independently of a duty cycle of a second inductor in the second switching regulator.

9. The apparatus of claim 1, wherein the second switching regulator has a negative current slew rate that is greater than a negative current slew rate of the first switching regulator.

10. The apparatus of claim 1, wherein the first switching regulator has a positive current slew rate that is greater than a positive current slew rate of the second switching regulator.

11. A method comprising:
    receiving a first input voltage in a first switching regulator;
    receiving a second input voltage in a second switching regulator; and
    controlling the first switching regulator to produce a first current through a first inductor and controlling the second switching regulator to produce a second current through a second inductor and a capacitor to maintain a first regulated voltage on an output node and a second regulated voltage between the second inductor and the capacitor,
    wherein the first switching regulator is configured to produce a first current slew rate and the second switching regulator is configured to produce a second current slew rate, and wherein the first current slew rate is different than the second current slew rate.

12. The method of claim 11, wherein the first input voltage is equal to the second input voltage, and wherein the second regulated voltage is equal to a difference between the first input voltage and the first regulated voltage.

13. The method of claim 11:
    wherein the first switching regulator produces the first current in response to a change in a reference signal; and
    the second switching regulator produces the second current in response to the change in the reference signal.

14. The method of claim 11:
    wherein the first switching regulator produces the first current in response to a change in a load current; and
    the second switching regulator produces the second current in response to the change in the load current.

15. The method of claim 11, further comprising:
    controlling the first switching regulator to generate a first capacitor recharge current; and
    controlling the second switching regulator to generate a second capacitor recharge current;
    wherein a sum of the first capacitor recharge current and the second capacitor recharge current is approximately zero.

16. The method of claim 11, wherein the second switching regulator has a negative current slew rate that is greater than a negative current slew rate of the first switching regulator.

17. The method of claim 11, wherein the first switching regulator is coupled to a load at the output node, and wherein the second switching regulator is coupled to the load through the capacitor.

18. The method of claim 11, wherein the first current slew rate corresponds to a rate of change in the first current through the first inductor and the second current slew rate corresponds to a rate of change in the second current through the second inductor.

19. The method of claim 11, wherein a duty cycle of the first inductor is controlled independently of a duty cycle of the second inductor.

20. The method of claim 11, wherein the first switching regulator has a positive current slew rate that is greater than a positive current slew rate of the second switching regulator.

* * * * *